(12) United States Patent
Azad et al.

(10) Patent No.: US 11,761,331 B2
(45) Date of Patent: Sep. 19, 2023

(54) QUANTIFICATION OF POLYMER VISCOELASTIC EFFECTS ON $S_{OR}$ REDUCTION USING MODIFIED CAPILLARY

(71) Applicant: The Governors of the University of Alberta, Edmonton (CA)

(72) Inventors: Madhar Sahib Azad, Edmonton (CA); Japan Trivedi, Edmonton (CA)

(73) Assignee: THE GOVERNORS OF THE UNIVERSITY OF ALBERTA, Edmonton (CA)

( * ) Notice: Subject to any disclaimer, the term of this patent is extended or adjusted under 35 U.S.C. 154(b) by 414 days.

(21) Appl. No.: 16/938,352

(22) Filed: Jul. 24, 2020

(65) Prior Publication Data

US 2021/0025275 A1 Jan. 28, 2021

Related U.S. Application Data

(60) Provisional application No. 62/879,192, filed on Jul. 26, 2019.

(51) Int. Cl.
*G01N 11/02* (2006.01)
*E21B 49/08* (2006.01)
*C09K 8/584* (2006.01)

(52) U.S. Cl.
CPC .......... *E21B 49/0875* (2020.05); *C09K 8/584* (2013.01); *G01N 11/02* (2013.01); *C09K 2208/30* (2013.01); *E21B 2200/20* (2020.05)

(58) Field of Classification Search
CPC ...... E21B 49/0875; G01N 11/02; C09K 8/584
USPC ....... 702/33, 50; 703/9, 10; 73/54.01, 54.02, 73/38, 152.18, 152.39, 152.41, 866
See application file for complete search history.

(56) References Cited

PUBLICATIONS

Pengpend Qi, et al., "Simulation of Viscoelastic Polymer Flooding—From the Lab to the Field," SPE191498MS, 2018 SPE Annual Tech . . . Conf. and Exh., Dallas, Texas, Sep. 24-26, 2018.

(Continued)

*Primary Examiner* — Robert R Raevis
(74) *Attorney, Agent, or Firm* — MaxGoLaw PLLC

(57) ABSTRACT

A method of quantifying a viscoelastic effect of a polymer on residual oil saturation ($S_{or}$) including calculating an extensional capillary number ($N_{ce}$) using flux, pore-scale apparent viscosity, and interfacial tension to account for the polymer's viscoelastic forces that are responsible for $S_{or}$ reduction. The polymer is used polymer flooding during enhanced oil recovery. An extensional capillary number is calculated for a plurality of polymer materials, which are then compiled in a database. Also provided is a reservoir simulator for predicting the $S_{or}$ reduction potential of the viscoelastic polymer, which includes a database of calculated extensional capillary numbers for a plurality of polymers. The database includes a curve generated from the calculated extensional capillary numbers for a plurality of polymers properties, flux rates, formation nature, oil viscosities, and rheological behaviors.

13 Claims, 28 Drawing Sheets

Quantifying a viscoelastic effect of polymers on residual oil saturation ($S_{or}$) by calculating an extensional capillary number ($N_{ce}$) for each polymers $$N_{ce} = \frac{v \times \mu_{app-pore}}{\sigma}$$

comparing the calculated $N_{ce}$ for each polymer selecting the optimal polymer for a set of specific reservoir conditions based on calculated $N_{ce}$ for each polymer

(56) References Cited

PUBLICATIONS

R.A. Fulcher, Jr., et al., "Effect of Capillary Number and Its Constituents on Two-Phase Relative Permeability Curves," J. Pet. Tech., Feb. 1985, pp. 249-260.
P. Kumar, et al., "Field Implementation of Mangala Polymer Flood: Initial Challenges, Mitigation and Management," SPE179820MS, SPE EOR Conf. at Oil and Gas West Asia, Muscat, Oman, Mar. 21-23, 2016.
M. Lotfollahi, et al., "Mechanistic Simulation of Residual Oil Saturation in Viscoelastic Polymer Floods," SPE179844MS, SPE EOR Conf. at Oil and Gas West Asia, Muscat, Oman, Mar. 21-23, 2016.
H. Luo, et al., "A Fractional Flow Theory for Unstable Immiscible Floods," SPE184996MS, SPE Canada Heavy Oil Tech. Conf, Calgary, Alberta, Canada, Feb. 15-18, 2017.
K.J. Humphry, et al., "Impact of Wettability on Residual Oil Saturation and Capillary Desaturation Curves," Int'l Sym. Society of Core Analysts, Napa Valley, California, Sep. 16-19, 2013.
Erincik, et al., "New Method to Reduce Residual Oil Saturation by Polymer Flooding," Society of Petroleum Engineers Journal, Oct. 2018, 99. 1944-1956.
Clarke, et al., "How Viscoelastic-Polymer Flooding Enhances Displacement Efficiency," Society of Petroleum Engineers Journal, Jun. 2016, pp. 675-687.
Hincapie, et al., "Assessment of Polymer Injectivity with Regards to Viscoelasticity: Lab Evaluations towards Better Field Operations," SPE-174346-MS, EUROPEC 2015 Conference held in Madrid, Spain, Jun. 1-4, 2015.
Han, et al., "Development of Chemical EOR Formulations for a High Temperature and High Salinity Carbonate Reservoir," IPTC 17084, International Petroleum Technology Conference held in Bejing, China, Mar. 26-28, 2013.
Delshad, et al., "Mechanistic Interpretation and Utilization of Viscoelastic Behavior of Polymer Solutions for Improved Polymer-Flood Efficiency," SPE 113620, 2008 SPE/DOE Improved Oil Recovery Symposium held in Tulsa, Oklahoma, U.S.A., Apr. 19-23, 2008.
De Melo, et al., "Evaluation of Polymer Injection Projects in Brazil," SPE 94898, SPE Latin American and Caribbean Petroleum Engineering Conference held in Rio de Janeiro Brazil, Jun. 20-23, 2005.
Cottin, et al., "Secondary and Tertiary Polymer Flooding on Highly Permeable Reservoir Cores: Experimental Results," SPE-169692-MS, SPE EOR Conference at Oil and Gas West Asia held in Muscat, Oman, Mar. 31-Apr. 2, 2014.
Clemens, et al., "Polymer Injection to Rejuvenate a Supermature Oil Field, Polymer Pilot Results, 8th Reservoir, Austria," SPE-183010-MS, Abu Dhabi International Petroleum Exhibition & Conference held in Abu Dhabi, UAE, Nov. 7-10, 2016.
Chen, et al., "History Matching Method for High Concentration Viscoelasticity Polymer Flood Pilot in Daqing Oilfield," SPE-144538, SPE Enhanced Oil Recovery Conference held in Kuala Lumpur, Malaysia, Jul. 19-21, 2011.
Johannesen, et al., "Mobilization of Remaining Oil-Emphasis on Capillary Number and Wettability," SPE-108724, 2007 International Oil Conference and Exhibition in Mexico held in Veracruz, Mexico, Jun. 27-30, 2007.
Jiang, et al., "The Effect of Elasticity on Displacement Efficiency in the Lab and Results of High Concentration Polymer Flooding in the Field," SPE-115315, 2008 SPE Annual Technical Conference and Exhibition held in Denver, Colorado, USA, Sep. 21-30, 2008.
M.S. Azad, et al., "Does Polymer's Viscoelasticity Influence Heavy-Oil Sweep Efficiency and Injectivity at 1 ft/D?" SPE193771, SPE Int'l Heavy Oil Conf. and Exh., Kuwait City, Kuwait, Dec. 10-12, 2018, pp. 1-17.
R.S. Seright, How Much Polymer Should Be Injected During a Polymer Flood? Review of Previous and Current Practices, SPE179543, SPE Improved Oil Recovery Conf., Tulsa, Apr. 11-13, 2018, pp. 1-18.

James J. Sheng, et al., "Status of Polymer-Flooding Technology," Journal of Canadian Petroleum Tech., Mar. 2015, pp. 116-126.
Heesong Koh, et al., "Experimental Investigation of the Effect of Polymers on Residual Oil Saturation," SPE179683, SPE Improved Oil Recovery Conf., Tulsa, Apr. 11-13, 2016, pp. 1-17.
Pengpeng Qi, et al., "Reduction of Residual Oil Saturation in Sandstone Cores by Use of Viscoelastic Polymers," SPE179689, SPE Improved Oil Recovery Conf., Tulsa, Apr. 11-13, 2016, pp. 447-458.
A. Stavaland, et al., "Polymer Flooding—Flow Properties in Porous Media Versus Rheological Parameters," SPE131103, SPE Europe/Eage Annual Conf. and Exh., Barcelona, Spain Jun. 14-17, 2010.
E.C.M. Vermolen, et al., "A Systematic Study of the Polymer Visco-Elastic Effect on Residual Oil Saturation by Core Flooding," SPE169681MS, SPE EOR Conf. at Oil and Gas West Asia, Muscat, Oman, Mar. 31-Apr. 2, 2014.
D. Wang, et al., "The Influence of Viscoelasticity on Displacement Efficiency—From Micro- to Macroscale," SPE109016, SPE annual Tech. Conf. and Exh., Anaheim, California, Nov. 11-14, 2007.
D. Wang, et al. "The Influence of Viscoelasticity on Micro Forces and Displacement Efficiency in Pores, Cores and in the Field," SPE127453, SPE EOR Conf. at Oil & Gas West Asia, Muscat, Oman, Apr. 11-13, 2010.
Z.B. Wang, et al., "A New Method of Numerical Simulation for Viscoelastic Polymer Flooding," SPE165972, SPE Reservoir Char. and Sim. Conf and Exh, Abu Dhabi, UAE, Sep. 16-18, 2013.
Wang Demin, et al., "Large Scale High Viscous-Elastic Fluid Flooding in the Field Achieves High Recoveries," SPE144294, SPE Enhanced Oil Recovery Conf, Kuala Lumpur, Malaysia, Jul. 19-21, 2011.
Xia Huifen, et al., "Elasticity of HPAM Solutions Increases Displacement Efficiency Under Mixed Wettability Conditions," SPE88456, SPE Asia Pacific Oil and Gas Conf, Perth, Australia, Oct. 18-20, 2004.
Wu Wenxiang, et al., "Effect of the Visco elasiticity of Displacing Fluids on the Relationship of Capillary Number and Displacement Efficiency in Weak Oil-Wet Cores," SPE109228, SPE Asia Pacific Oil and Gas Conf, Jakarta, Indonesia, Oct. 30-Nov. 1, 2007.
George L. Stegemeier, "Relationship of Trapped Oil Saturation to Petrophysical Properties of Porous Media," SPE4754, Improved Oil Recovery Symp. of the Soc. of Pet. Eng. of AIME, Tulsa, Oklahoma, Apr. 22-24, 1974.
Wang Demin, et al., "Viscous-Elastic Polymer Can Increase Microscale Displacement Efficiency in Cores," SPE63227, SPE Annual Technical Conf. and Exh., Dallas, Texas, Oct. 1-4, 2000.
A. Abrams, "The Influence of Fluid Viscosity, Interfacial Tension, and Flow Velocity on Residual Oil Saturation Left by Waterflood," Society of Petroleum Eng. Journal, Oct. 1975, pp. 437-447.
M.S. Azad, et al., "Extensional Effects during Viscoelastic Polymer Flooding: Understanding Unresolved Challenges," 2020 SPE Journal, pp. 1-15.
M.S. Azad, et al., Quantification of the Viscoelastic Effects During Polymer Flooding: A Critical Review, Dec. 2019 SPE Journal, pp. 2731-2757.
Ali Afsharpoor, et al., "CFD modeling of the effect of polymer elasticity on residual oil saturation at the pore-scale," Jour. Pet. Science and Eng., 94-95 (2012), pp. 79-88.
Madhar S. Azad, et al., "Novel viscoelastic model for predicting the synthetic polymer's viscoelastic behavior in porous media using direct extensional rheological measurements," Fuel 235 (2019), pp. 218-226.
M.S. Azad, et al., "Extending the Applicability of Chemical EOR in High Salinity, High Temperature & Fractured Carbonate Reservoir Through Viscoelastic Surfactants," SPE172188MS, SPE Saudi Arabia Sec. Annual Tech. Symp. and Exh., Al-Khobar, Saudi Arabia, Apr. 21-24, 2014.
MAdhar Sahib Azad, Thesis—Evaluation of Novel Viscoelastic Systme as a Potential Chemical for Method in Carbonate Reservoirs, King Fahd Univ. of Petroleum & Minerals, Dharan, Saudi Arabia, Nov. 2014.
M.S. Azad, et al., "Extensional rheological data from ex-situ measurements for predicting porous media behaviour of the viscoelastic EOR polymers," Data in Brief, 20 (2018), pp. 293-305.

(56) References Cited

PUBLICATIONS

Madhar S. Azad, et al., "Capillary breakup extenesional rheometry of associative and hydrolyzed polyacrylamide polymers for oil recovery applications," J. Appl. Polym. Sci., 2018, DOI: 10.1002/App.46253.

S.M. Hochandel, et al., "A Comparison of 31 Minnelusa Polymer Floods With 24 Minnelusa Waterfloods," SPE/DOE20234, SPE. DOE Seventh Symp. on Enhanced Oil Recovery, Tulsa, Oklahoma, Apr. 22-25, 1990.

G.J. Hirasaki, et al., "Analysis of Factors Influencing Mobility and Adsorption in the Flow of Polymer Solution Through Porous Media," Soc. of Pet. Eng. J, Aug. 1974, pp. 337-346.

R. Haas, et al., "Viscoelastic flow of dilute polymer solutions in regularly packed beds," Rheol. Acta 21, 1982, pp. 566-571.

B.L. Greaves, et al., "Hitts Lake Unit Polymer Project," SPE13123, 59th Annual Tech. Conf. and Exh., Houston, Texas, Sep. 16-19, 1984.

W.R. Foster, "A Low-Tension Waterflooding Process," J. Pet. Tech., Feb. 1973, pp. 205-210.

I. Chatzis, et al., "Effect of Capillary Number on the Microstructure of Residual Oil in Strongly Water-Wet Sandstones," SPE Res. Eng, Aug. 1988, pp. 902-912.

Christian Clasen, "Capillay Breakup Extensional Rheometry of Semi-dilute Polymer Solutions," Dept. of Chem. Eng., Katholieke Univ. Leuven, 2010.

I. Chatzis, et al., "Correlation of Capillary Number Relationships for Sandstone," Soc. of Pet. Eng. J., Oct. 1984, pp. 555-562.

M.S. Azad, et al., "Understanding the Flow Behaviour of Copolymer and Associative Polymers in Porous Media Using Extensional Viscosity Characterization: Effect of Hydrophobic Association," CA J. of Chem. Eng., vol. 96, Nov. 2018.

Y. Masuda, et al., "1D Simulation of Polymer Flooding Including the Viscoelastic Effect of Polymer Solution," SPE Reservoir Eng., May 1992.

J.C. Melrose, et al., "Role of Capillary Forces in Determining Microscopic Displacement Efficiency for Oil Recovery by Waterflooding," J. Canadian Pet. Tech, Oct.-Dec. 1974.

Nahn Ju Kim, et al., "Capillay breakup extensional rheometry of a wormlike micellar solution," Korea-Australia Rheology Journal, Mar. 2010, vol. 22, No. 1, pp. 31-41.

M.S. Kamal, et al., "Review on Surfactant Flooding: Phase Behavior, Retention, IFT, and Field Applications," Energy Fuels, 2017, 31, pp. 7701-7720.

P.D. Moffitt, et al., "North Burbank Unit Commercial Scale Polymerflood Project—Osage County, Oklahoma," SPE11560, 1983 Prod. Op. Symp., Oklahoma City, Oklahoma, Feb. 27-Mar. 1, 1983.

Wimpy Karnanda, et al., "Effect of temperature, pressure, salinity, and surfactant concentration on IFT for surfactant flooding optimization," Arab J. Geosci. (2013) 6:3535-3544.

(b)

(c)

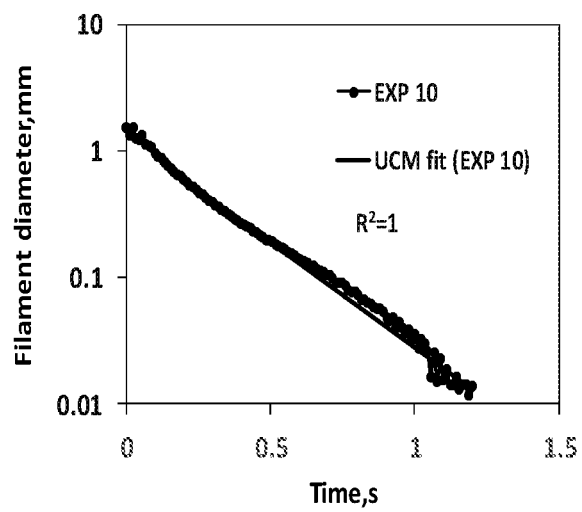
FIG. 17A
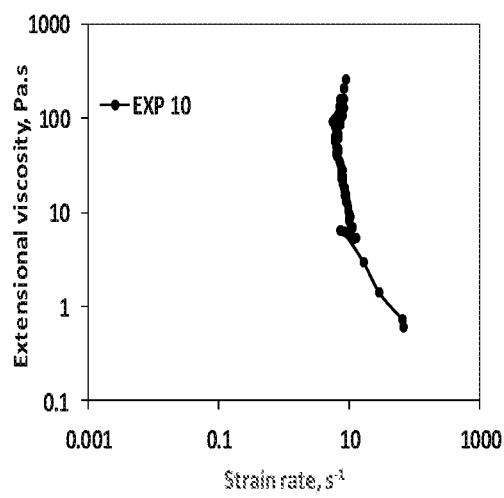
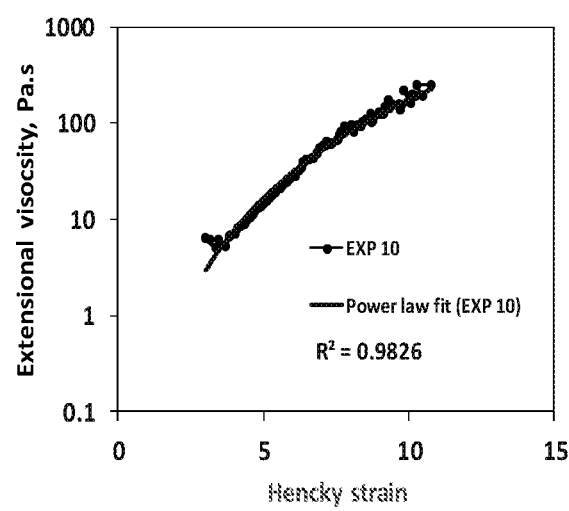
FIG. 17B
FIG. 17C

Quantifying a viscoelastic effect of polymers on residual oil saturation ($S_{or}$) by calculating an extensional capillary number ($N_{ce}$) for each polymers $$N_{ce} = \frac{\upsilon \times \mu_{app-pore}}{\sigma}$$

↓ comparing the calculated $N_{ce}$ for each polymer

↓ selecting the optimal polymer for a set of specific reservoir conditions based on calculated $N_{ce}$ for each polymer

FIG. 31

QUANTIFICATION OF POLYMER VISCOELASTIC EFFECTS ON $S_{OR}$ REDUCTION USING MODIFIED CAPILLARY

CROSS-REFERENCE TO RELATED APPLICATION

This application claims priority of U.S. Provisional Patent Application Ser. No. 62/879,192 filed Jul. 26, 2019, which is incorporated herein by reference.

FIELD OF INVENTION

The present invention generally relates to methods of predicting residual oil saturation (Sor), and more particularly to methods of predicting residual oil saturation during viscoelastic polymer flooding during enhanced oil recovery (EOR).

BACKGROUND

Incremental oil recovered during enhanced oil recovery (EOR) processes could be due to both enhanced sweep and displacement efficiency. Sweep efficiency will be higher if the displacing slugs contact more oil with a minimal pore volume of injection. High oil viscosity and heterogeneity are the limiting factors affecting sweep efficiency. Sweep conventionally believed to be the field-scale mechanism has been reported to be a core-scale phenomenon, especially if the oil viscosity is high. The main purpose of any EOR methods is to increase the oil recovery factor in the water flooded reservoir. The oil left in the reservoir after water flooding could be either residual oil or bypassed oil. Conventionally it is believed that polymer flood can only recover the bypassed oil by increasing the sweep efficiency. In recent times, viscoelastic polymer flooding was reported to cause an increase in Sor reduction. Capillary number conventionally used to correlate Sor reduction were reported to remain the same for polymers of various elasticity, despite their differences in the Sor reduction potential. The conventional notion is that the higher the Nc, the higher the Sor reduction.

Microscopic displacement efficiency is not a core-scale phenomenon; Rather strictly, it is a pore-scale phenomenon. Residual oil by definition is the oil that is swept well by the displacing water but that failed to become mobilized due to high interfacial tension (IFT) between the water and oil. Capillarity will be higher when the IFT is high. Smaller pore radius also leads to higher capillary forces (Green and Willhite 1998). The interplay between the viscous and capillary force has been well described by the dimensionless number called capillary number ($N_c$). Generally, oil will be trapped at the capillary pressure of 1000 psi/ft while the viscous force is of the order of few psi/ft (Peter 2002). This residual oil can be recovered if the viscous force provided by the displacing slugs is sufficient enough to overcome the trapping capillary force (Peter 2002). The relation between $S_{or}$ reduction and $N_c$ is described by the capillary desaturation curve (CDC) (Green and Willhite 1998). As per the CDC curve, rapid oil mobilization begins to occur when $N_c$ exceeds 10, to 104 for sandstone reservoirs (Melrose and Brander 1974; Stegemeier 1974; Abrams 1975; Chatzis and Morrow 1984; Chatzis et al. 1988; Johannesen et al. 2007; Humphry et al. 2014) and complete mobilization is expected to occur only when the $N_c$ exceeds $10^{-2}$ (Foster 1973; Abrams 1975; Chatzis and Morrow 1984; Jr. et al. 1985). To increase the $S_{or}$ reduction, $N_c$ has to be increased. Mathematically, viscous force can be increased by either increasing the injection rate or by increasing the displacing fluid's viscosity. Both the options are not practically feasible, as increasing the viscosity by several orders may lead to injectivity issues and increasing the rate leads to the fracturing of reservoirs. Most of the residual oil is located in the farthest part of the wellbore, where low flux conditions prevail. The only way to recover residual oil that is practically feasible is to reduce the capillary trapping force for which the surfactant flooding capable of providing ultra-low IFT is employed (Green and Willhite 1998). IFT has been used a parameter to screen or formulate the optimal surfactants for enhancing microscopic oil recovery (Azad 2014; Azad and Sultan 2014; Han et al. 2013; Kamal et al. 2017).

Polymer solutions are conventionally employed to increase the sweep efficiency by altering the mobility ratio between the displacing slug and displaced oil. Additional oil recovery attained during polymer flooding in the field has been attributed to enhanced sweep efficiency (Moffitt and Mitchell 1983; Greaves et al. 1984; Hochanadel et al. 1990; De Melo et al. 2014; Clemens et al. 2016; Kumar et al. 2016). Polymer solutions do not reduce the IFT significantly. They can increase the $N_c$ by 1 or 2 orders maximum with their viscosity, which will not be sufficient to mobilize the significant amount of residual oil. Therefore, conventionally it is believed that polymer flooding cannot reduce $S_{or}$. In recent times, however, viscoelastic polymers were reported to cause an additional residual oil recovery in the Daqing field (Wu et al. 2007). There were some studies which argued against the polymer's viscoelastic influence on the $S_{or}$ reduction under certain conditions (Schneider and Owens 1982; Huh and Pope 2008; Vermolen et al. 2014; Erinick et al. 2018; Seright et al. 2018). Azad and Trivedi (2019a) listed those conditions that are relatively unfavorable for the viscoelastic polymer to recover the residual oil. Nevertheless, several recent results have asserted the polymer viscoelastic influence on $S_{or}$ reduction beyond that of water flood (Wang et al. 2000; Wang et al. 2001; Wang et al. 2007; Xia et al. 2008; Jiang et al. 2008; Wang et al. 2010; Wang et al. 2011; Ehrenfried 2013; Vermolen et al. 2014; Clarke et al. 2015; Qi et al. 2017; Qi et al. 2018). It is to be noted that all the aforementioned literature has asserted the polymer's viscoelastic influence on $S_{or}$ reduction specifically by ensuring the recovered oil is the true residual oil that is well swept. Some studies specifically emphasize the polymer's viscoelastic influence on the $S_{or}$ reduction even at the flux of ~1 ft/day and the intermediate $N_c$ of $10^{-5}$ to $10^{-6}$ (Ehrenfried 2013; Clarke et al. 2016; Cottin et al. 2014; Qi et al. 2017; Koh 2017). The polymer flood shows rapid oil mobilization even before the critical $N_c$ (at low flux) which invalidates the capillary theory (Lotfollahi et al. 2016b; Qi et al. 2017). The proper mechanisms causing this $S_{or}$ reduction at low flux are not understood and wettability alteration has been proposed as the mechanism (Seright 2017). Azad and Trivedi (2019b) speculated extensional viscosity might be the reason.

To account for the polymer's sweep efficiency, mobility ratio is widely used (Green and Willhite 1998). Mobility ratio by definition is the ratio between the mobility of displacing slugs and displaced oil. Mobility is the ratio between the permeability and viscosity. The higher the viscosity, the lower the mobility ratio and the higher the sweep efficiency. Viscoelastic polymers possessing higher apparent viscosity contribute more to the higher sweep efficiency than polymers possessing higher elasticity (Azad and Trivedi 2018b). The role of the viscosity of viscoelastic polymers on sweep efficiency has been reported in more literature (Chen et al. 2011; Wang et al. 2013). These clearly indicate the apparent viscosity can be used in the mobility ratio calculation for accounting for the sweep efficiency. However, to account for the microscopic displacement efficiency of viscoelastic polymer flooding, apparent viscosity might not be appropriate, which is discussed below.

The positive influence that the viscoelastic polymers have on residual oil saturation ($S_{or}$) reduction during enhanced oil recovery (EOR) has been reported in recent literature. Conventional capillary number ($N_c$) calculated using the core-scale apparent viscosity is commonly used to correlate the $S_{or}$ reduction potential of chemical slugs. However, $N_c$ remained the same for the set of polymer solutions of different elasticity, despite the higher $S_{or}$ reduction shown by the highly elastic polymer solutions. As per the capillary theory, residual oil cannot be mobilized unless the capillary number exceeds the critical capillary number. However, during viscoelastic polymer flooding, significant amount of residual oil was reported to be recovered even before the critical Nc. Therefore, capillary theory fails in the case of viscoelastic polymer flooding with the usage of conventional Nc. Oscillatory Deborah number (De) has been deemed as a better option for correlating the Sor reduction during viscoelastic polymer flooding. High saline viscoelastic polymer solutions possessing lower oscillatory relaxation time were reported to cause higher Sor reduction than low saline viscoelastic polymer possessing higher oscillatory De. Oscillatory De was also reported to be similar for both viscous and viscoelastic polymer solutions. Despite the limitation of conventional Nc and De, all the existing models used for predicting the $S_{or}$ during viscoelastic polymers relies on either conventional Nc and/or De. Employing those models for predicting Sor in a reservoir simulator could give a false estimate about the oil recovery potential of different viscoelastic polymer solutions. Further, using the oscillatory De or conventional Nc for choosing the optimal polymer for oil recovery applications could lead to erroneous selection. Residual oil recovery is a pore-scale phenomenon, Polymer solutions flowing in the porous media are likely to exhibit 75% non-linear, elongational resistance at pore-scale. Conventional Nc incorporating apparent viscosity may overlook the pore-scale elongational effects and De calculated using the oscillatory rheology may over look the non-linear viscoelastic effects at the pore-scale.

The surfactant solutions having lower IFT (higher $N_c$) were reported to contribute to higher $S_{or}$ reduction (Foster 1973; Karnanda et al. 2013; Sheng 2015). However, higher $S_{or}$ reduction is shown by the highly elastic polymers over viscous or less elastic polymers, despite possessing the similar $N_c$ (Qi et al. 2017). It is important to point out here that conventional $N_c$ is calculated using the apparent viscosity (Ehrenfried 2013 Qi et al. 2017; Koh 2017; Erinick et al. 2018). Micro-force or normal stress has been identified as the reason for higher $S_{or}$ reduction by highly elastic polymers (Wang et al. 2001; Xia et al. 2004; Xia et al. 2008; Afsharpoor et al. 2012; Wang et al. 2013; Lotfallahi et al. 2016b). Normal stress is related to extensional viscosity (Barnes 2010). The conventional notion that core-scale apparent viscosity encompasses extensional viscosity (Hirasakhi and Pope 1974; Masuda et al. 1992; Delshad et al. 2008; Stavland et al. 2010; Clarke et al. 2015) is refuted by Azad and Trivedi (2019b) who show that actual extensional viscosity is three orders higher than the core-scale apparent viscosity. Azad and Trivedi (2019 b) reported that extensional viscosity should not be treated as the constituent of core-scale apparent viscosity for pore-scale applications such as $S_{or}$ reductions. IFT that measures the tension between the water and oil interface is a microscopic property. Similarly, extensional viscosity which gives the measure of polymer's resistance to stretching around the pore is also a microscopic phenomenon (Haas and Durst 1982). The transient nature of elastic response means that normal stresses or extensional viscosity will be dominated only in the micro region of the pore (Wang et al. 2007). Coincidently, capillary pressure tends to be higher in that micro region characterized by the smaller radius, which in turn causes the higher trapping of residual oil. Microscopic residual oil displacement is a pore-scale phenomenon. So, if the microscopic property such as IFT has been used in the $N_c$ for relating it with $S_{or}$ (Green and Willhite 1998), the extensional viscosity should also be incorporated into $N_c$. Challenges involved in the extensional measurement of EOR polymers were well documented in previous publications (Azad and Trivedi 2017; Azad et al. 2018a; Azad et al. 2018b; Azad and Trivedi 2018a; Azad and Trivedi 2018b; Azad and Trivedi 2019a).

To quantify the polymer's viscoelastic effects on $S_{or}$ reduction, few pore-scale models have been proposed. These include models proposed by Chen et al. (2012), Wang et al. (2013), and Lotfallahi et al. (2016b). All these models fail to honor the capillary theory because they either rely on the normal stress and/or Deborah number. All the models that stress the importance of normal stress rely on empirical fitting parameters determined from core flooding. In the case of surfactant flooding, $S_{or}$ reduction can be quantified through IFT, which is a bulk property. It is worthwhile to mention here that the Azad Trivedi viscoelastic model (AT-VEM) is the first viscoelastic model that can predict the apparent viscosity for various ranges of shear rates through bulk rheology alone (Azad and Trivedi 2018a; Azad and Trivedi 2019). Similarly, any methodology that can quantify the $S_{or}$ reduction through bulk properties alone is desirable, which can help in the quick screening of optimal slugs. The model developed by Qi et al. (2018) is independent of core flood experiments. However, Qi et al.'s (2018) method is exclusively based on the conventional Deborah number ($D_e$).

$D_e$ is widely used by chemical EOR researchers for quantifying the polymer viscoelastic effects during chemical EOR. If the transit time of the polymer solutions between pore body and pore throat is less compared to their relaxation time, then the fluid will exhibit elastic strain that causes a higher pressure drop, which would be more than expected from shear forces. It is to be noted that the relaxation time used by most EOR researchers are oscillatory based (Magbagbeola 2008; Delshad et al. 2008; Ehrenfried 2013; Vermolen et al. 2014; Koh 2015; Hincapie and Gazner 2015; Qi et al. 2017; Erinick et al. 2018; Qi et al. 2018), which represents the linear viscoelastic effects (Howe et al. 2015). Several misconceptions exist because of the usage of an oscillatory Deborah number, especially when there is variation in the salinity. High saline polymer solutions possessing lower $D_e$ were reported to cause higher $S_{or}$ reduction than the low saline polymer solutions possessing higher $D_e$ (Ehrenfried 2013; Erinick et al 2018). Magbagbeolo (2008) reported that high saline polymer solutions (with the lower oscillatory Deborah number) resulted in the higher strain hardening index than the low saline polymer solutions (with the higher oscillatory Deborah number). Azad and Trivedi (2018d) also showed, using direct extensional measurements, that high saline polymer solution (with the lower oscillatory $D_e$) provided higher extensional resistance than the low saline polymer solutions (with the higher oscillatory $D_e$). When the polymer solutions flow from the pore body to pore throat, they stretch and generate extensional resistance to flow. Therefore, using the linear relaxation time determined from the oscillatory rheology for mimicking the flow from pore body to pore throat is not ideal for Deborah number calculation (Azad and Trivedi 2019b).

As discussed, $N_c$ fails to explain the different residual oil recovery potential of viscoelastic polymers varying in the elasticity. Oscillatory $D_e$ appears to be deficient in honoring the non-linear viscoelastic effects that the EOR polymer solutions are expected to exhibit.

Thus, there exists a need for a method of predicting residual oil saturation during viscoelastic polymer flooding during enhanced oil recovery without the above noted limitations, such that polymer flood operators are able to select an optimal polymer before polymer flood when $N_c$ of different viscoelastic polymers remains the same.

SUMMARY OF THE INVENTION

The present invention provides a method of quantifying a viscoelastic effect of a polymer on residual oil saturation ($S_{or}$). According to embodiments, the polymer is used in polymer flooding is used during enhanced oil recovery (EOR). The method includes calculating an extensional capillary number ($N_{ce}$) using flux, pore-scale apparent viscosity, and interfacial tension (IFT) to account for the polymer's viscoelastic forces that are responsible for Sor reduction. According to embodiments, an extensional capillary number is calculated for a plurality of polymer materials, which then may be compiled in a database. An increase in the $N_{ce}$ will result in an increase in the $S_{or}$ reduction. Also provided is a reservoir simulator for predicting the $S_{or}$ reduction potential of the viscoelastic polymer, which according to embodiments includes a database of calculated extensional capillary numbers for a plurality of polymers. According to embodiments, the database includes a curve generated from the calculated extensional capillary numbers for a plurality of polymers properties, flux rates, formation nature, oil viscosities, and rheological behaviors.

BRIEF DESCRIPTION OF THE DRAWINGS

FIGS. 17A-17C show graphs of Filament diameter vs time plot for EXP 10 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index;

FIG. 31 is a flow-chart containing the steps used in selecting the optimal polymer for a set of specific reservoir conditions based on calculated Nce values for each polymer according to certain embodiments of the present invention.

DETAILED DESCRIPTION

The present invention has utility as methods of predicting residual oil saturation during viscoelastic polymer flooding during enhanced oil recovery (EOR). The inventive method allows polymer flood operators are able to select an optimal polymer before polymer flood when Nc of different viscoelastic polymers remains the same. The present invention also provides polymer producers quick tool to analyze designed/manufactured polymers and optimize their polymer design. The present invention provides the $N_c$ using the actual measured extensional viscosity ($N_{ce}$) and then using it for developing a correlation for predicting the $S_{or}$ reduction potential of viscoelastic polymers. Twenty-three different data sets, extracted from different experiments, are used for developing the correlation. The pore-scale in-situ viscosity is presented using the shear and extensional rheological parameters to account for the viscoelastic driving force in the $N_{ce}$. The $N_{ce}$ is compared with the conventional $N_c$ and $D_e$. The proposed correlation is compared for its predictability with the latest correlation developed at UT-Austin by Qi et al. (2018). It is ensured through comparative discussion that the deficiency persisting with the existing methods are addressed through the $N_{ce}$.

Figure 1:
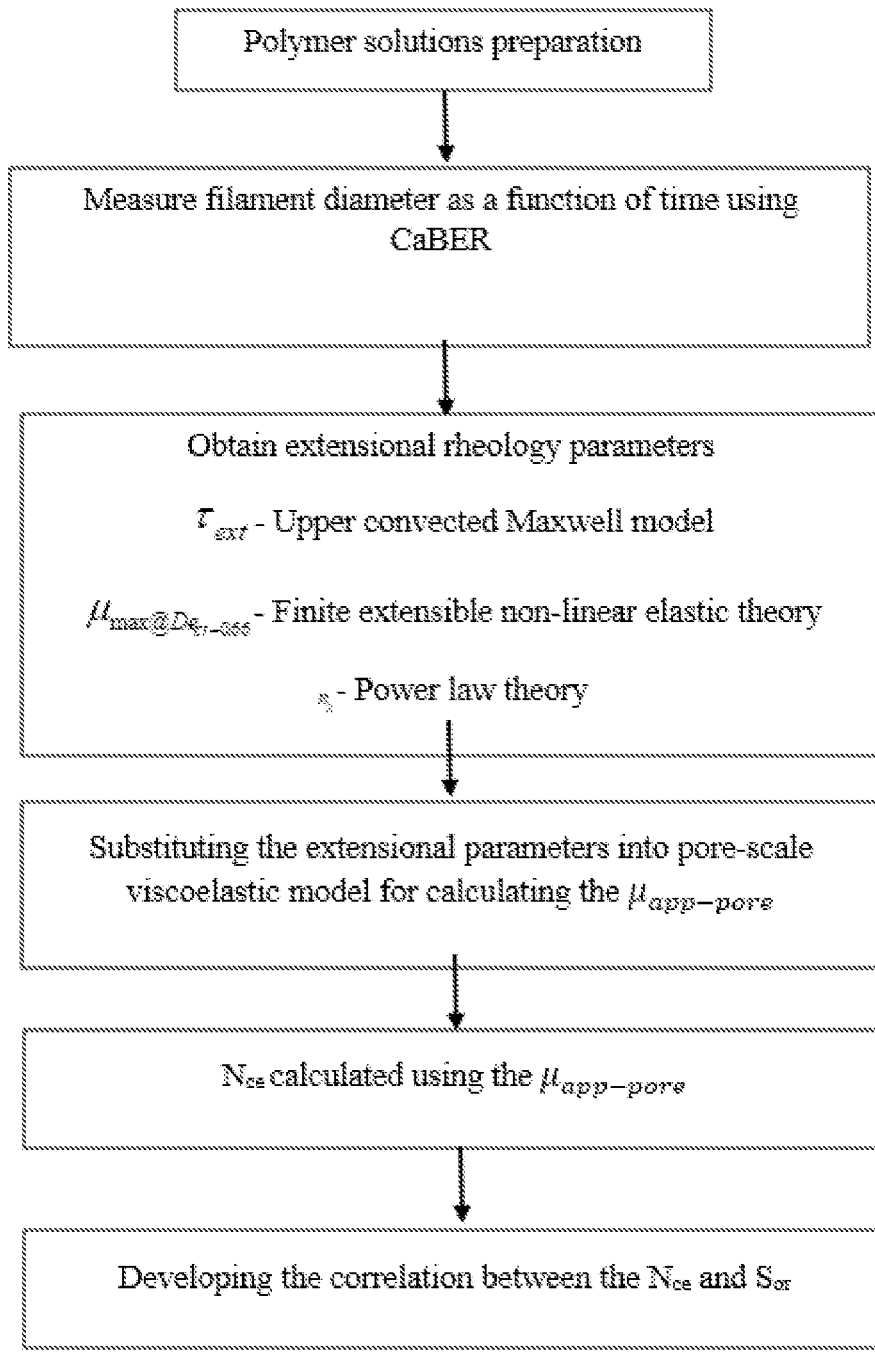
FIG. 1 is a flow-chart containing the steps used in the development of correlation according to embodiments of the present invention.

The steps involved in the development of the method to quantify the polymer's viscoelastic effects on $S_{or}$ reduction is shown in the FIG. 1.

It is to be understood that in instances where a range of values are provided that the range is intended to encompass not only the end point values of the range but also intermediate values of the range as explicitly being included within the range and varying by the last significant figure of the range. By way of example, a recited range of from 1 to 4 is intended to include 1-2, 1-3, 2-4, 3-4, and 1-4.

Polymer preparation and CaBER experiments: Capillary breakup extensional rheometer is used to characterize the extensional rheological properties of various polymer solutions. The details about the polymer type, molecular weight, concentration, salinity and temperature are reported in the Table 1. The polymers are obtained from SNF floerger. The polymer solutions are prepared by low speed mixing of 200 rpm. For conducting extensional rheology measurements, small quantity of the prepared polymer solutions is loaded between the two circular plates of 6 mm. The top plate is separated from the bottom plate which result in the formation of filament. The operational conditions during extensional rheological measurements are reported in Table 2. Filament drainage, governed by the balance between the driving capillary action and resisting polymer's viscosity and elasticity, is monitored by a laser micrometer. The filament diameter as a function of time for all the solutions are shown in the FIGS. 8A-30C. Water and glycerin solutions used in Experiment 20 through Experiment 23 possess negligible resistance to break up when compared to the viscoelastic polymer solutions used in Experiment 1 through Experiment 19. Extensional rheological parameters are obtained from the filament diameter data using appropriate theories.

TABLE 1

Shear and extensional rheological properties of various polymer solutions

| EXP | Authors | Polymer | Conc. (ppm) | Salinity (ppm) | Temp (° C.) | $\mu_\infty$ (cP) | $\mu_p^o$ (cP) | $\lambda$ (s) | n | $\tau_{ext}$ (s) | $\mu_{max}$ (cP) | $n_2$ |
|---|---|---|---|---|---|---|---|---|---|---|---|---|
| 1 | Qi et al. (2017) | HPAM 3630 | 2100 | 11000 | Room | 1 | 145 | 0.133 | 0.632 | 0.516 | 620000 | 3.74 |
| 2 | Qi et al. (2017) | HPAM 3630 | 1800 | 11000 | Room | 1 | 110 | 0.1 | 0.6 | 0.352 | 560000 | 3.57 |
| 3 | Erinick et al. (2018) | HPAM 3630 | 3400 | 26600 | Room | 25 | 232 | 0.11 | 0.32 | 0.456 | 760000 | 3.77 |
| 4 | Erinick et al. (2018) | HPAM 3630 | 2000 | 1400 | Room | 25 | 232 | 0.11 | 0.32 | 0.25 | 228000 | 2.66 |
| 5 | Erinick et al. (2018) | HPAM 3630 | 2000 | 1400 | Room | 25 | 232 | 0.11 | 0.32 | 0.25 | 228000 | 2.66 |
| 6 | Erinick et al. (2018) | HPAM 3630 | 3548 | 24300 | Room | 25 | 232 | 0.11 | 0.32 | 0.44 | 813000 | 4.05 |
| 7 | Ehrenfried (2013) | HPAM 3630 | 1500 | 4000 | Room | 11 | 139 | 2 | 0.81 | 0.229 | 410000 | 3.12 |
| 8 | Ehrenfried (2013) | HPAM 3630 | 1500 | 4000 | Room | 11 | 139 | 2 | 0.81 | 0.229 | 410000 | 3.12 |
| 9 | Ehrenfried (2013) | HPAM 3630 | 1000 | 1000 | Room | 11 | 139 | 2 | 0.81 | 0.117 | 117000 | 3.08 |
| 10 | Ehrenfried (2013) | HPAM 3630 | 1500 | 15000 | Room | 8 | 56 | 2 | 0.86 | 0.0879 | 250000 | 3.39 |
| 11 | Ehrenfried (2013) | HPAM 3630 | 1500 | 15000 | Room | 8 | 56 | 2 | 0.86 | 0.0879 | 250000 | 3.39 |
| 12 | Ehrenfried (2013) | HPAM 3630 | 1500 | 15000 | Room | 8 | 56 | 2 | 0.86 | 0.0879 | 250000 | 3.39 |
| 13 | Clarke et al. (2015) | HPAM 6040 | 640 | 4700 | Room | 19 | 197 | 33 | 0.88 | 0.19 | 210000 | 3.58 |
| 14 | Clarke et al. (2015) | HPAM 3130 | 6000 | 4700 | Room | 49 | 197 | 2.5 | 0.96 | 0.0266 | 40000 | 3.29 |
| 15 | Koh et al. (2017) | HPAM 3630 | 1200 | 2000 | 68 | 4.71 | 59.78 | 0.27 | 0.57 | 0.307 | 320000 | 3.16 |
| 16 | Koh et al. (2017) | HPAM 3630 | 1300 | 2000 | 68 | 5.52 | 156 | 0.45 | 0.62 | 0.37 | 370000 | 3.5 |
| 17 | Koh et al. (2017) | HPAM 3630 | 2450 | 2000 | 68 | 10.4 | 1318 | 1.62 | 0.62 | 0.72 | 620000 | 3.61 |

TABLE 1-continued

Shear and extensional rheological properties of various polymer solutions

| EXP | Authors | Polymer | Conc. (ppm) | Salinity (ppm) | Temp (° C.) | $\mu_\infty$ (cP) | $\mu_p^o$ (cP) | $\lambda$ (s) | n | $\tau_{ext}$ (s) | $\mu_{max}$ (cP) | $n_2$ |
|---|---|---|---|---|---|---|---|---|---|---|---|---|
| 18 | Koh et al. (2017) | HPAM 3330 | 2000 | 25878 | 55 | 6.23 | 19.68 | 0.05 | 0.62 | 0.24 | 550000 | 3.69 |
| 19 | Cottin et al. (2014) | HPAM 3630 | 500 | 5600 | 65 | 1.409 | 23.57 | 1 | 0.72 | 0.082 | 197000 | 3.36 |
| 20 | Clarke et al. (2015) | Water | N.A | 4700 | Room | 1 | 1 | N.A | N.A | 0.00048 | 173 | −2.06 |
| 21 | Clarke et al. (2015) | Water | N.A | 4700 | Room | 1 | 1 | N.A | N.A | 0.00048 | 173 | −2.06 |
| 22 | Erinick et al. (2018) | Water | N.A | 2000 | Room | 1 | 1 | N.A | N.A | 0.00048 | 173 | −2.06 |
| 23 | Erinick et al. (2018) | Glycerin | 800000 | 2000 | Room | 57 | 57 | N.A | N.A | 0.001 | 374 | −2.18 |

TABLE 2

Operational parameters

| Operational parameters | Value |
|---|---|
| Initial distance between top and bottom plate | 3 mm |
| Final distance between top and bottom plate | 8.2 mm |
| Aspect ratio | 2.73 |

Models for the Extensional Rheological Parameters:

UCM model for determining extensional relaxation time: Extensional relaxation time ($\tau_{ext}$) is attained by fitting the upper convected Maxwell model to the linear part of the filament diameter-time data in the semi-log plot. Extracted and fitted data are represented by blue lines in FIGS. 8A-30C. The slope represents the longest relaxation time (Clasen et al. 2006; Plog et al. 2004 and Azad and Trivedi 2019a) and the average value of the relaxation time is calculated from slope using the Equation 1.

$$D_{mid}(t) = D_o \left(\frac{GD_0}{4\sigma_s}\right)^{\frac{1}{3}} e^{(-t/3\tau_{ext})} \quad \text{Equation 1}$$

where
$D_{mid}(t)$=Midpoint diameter at time t, mm
$D_o$=Initial Diameter of the sample loaded, mm
G=Elastic Modulus, Pa
$\sigma_s$=Surface tension of polymer samples, mN/m
$\tau_{ext}$=Extensional relaxation time of sample, s The extracted relaxation time for all 23 solutions is shown in Table 1. The extensional relaxation time of water is $4*10^{-4}$ s. The extensional relaxation time of glycerin is $1*10^{-3}$ s. The extensional relaxation time of the viscoelastic polymer solutions is significantly higher than the extensional relaxation time of viscous glycerin (Table 1).

FENE theory for determining maximum extensional viscosity: Extensional viscosity ($\mu_{ext}$) as a function of strain rate, calculated using Equation 2 and Equation 3 for all the data sets are shown in FIG. 8B to 30B.

$$\mu_{ext} = -\frac{(2X-1)\sigma_s}{\frac{dD_{mid}}{dt}} \quad \text{Equation 2}$$

where
$\mu_{ext}$=Extensional viscosity, Pa·s
X=Axial correction factor (0.712).

$$\dot{\varepsilon}(t) = -\frac{2}{D_{mid}(t)} \left(\frac{dD_{mid}(t)}{dt}\right) \quad \text{Equation 3}$$

where
$\dot{\varepsilon}$=Strain/Elongation rate, $s^{-1}$

Figure 2:
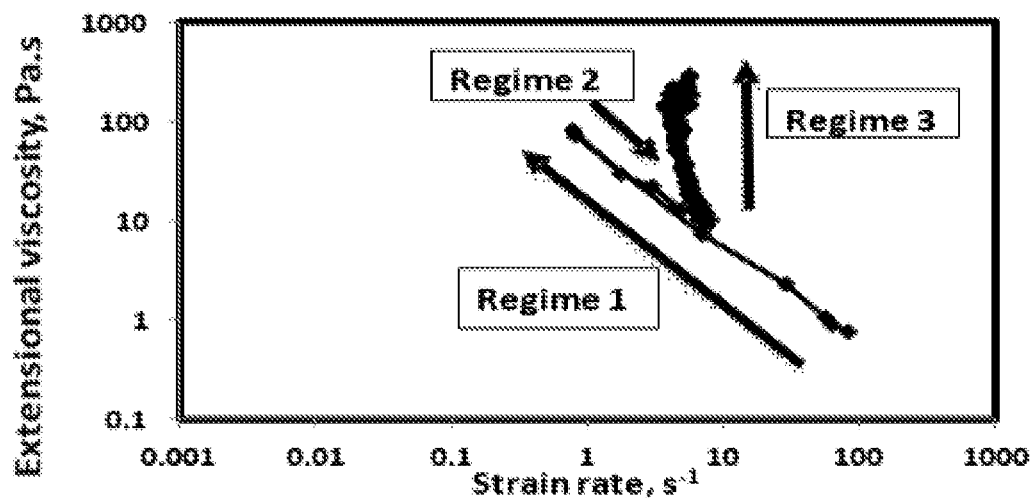
FIG. 2 is a graph showing the typical extensional viscosity vs the generated strain rate behavior during CaBER experiment.

Extensional rheological behavior of the viscoelastic polymer solutions in the shear-free uniaxial extensional field is completely different than the conventional behavior typically observed in the shear field. In the pure-shear field the viscoelastic polymer solutions show a decrease in the viscosity with respect to the imposed strain rate (Delshad et al. 2008; Seright et al. 2011a, b; Azad et al. 2018a,b; Azad and Trivedi 2018a,b; Azad and Trivedi 2019a,b,c). However, the extensional viscosity shows different regimes with respect to the strain rate (Classen 2010; Azad and Trivedi 2019a; Azad and Trivedi 2019b). The extensional viscosity as a function of generated strain rate during uniaxial extensional rheological experiments is shown in the FIG. 2.

Figure 9A:
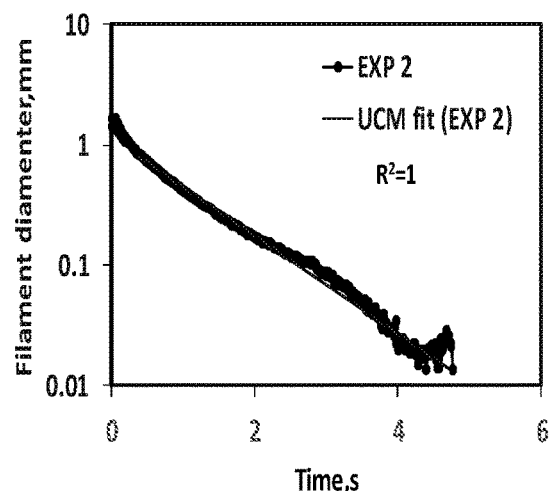
FIGS. 9A-9C show graphs of Filament diameter vs time plot for EXP 2 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 9B:
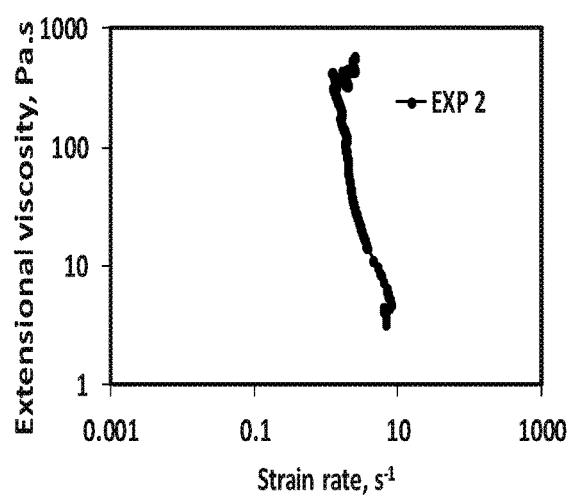
Figure 9C:
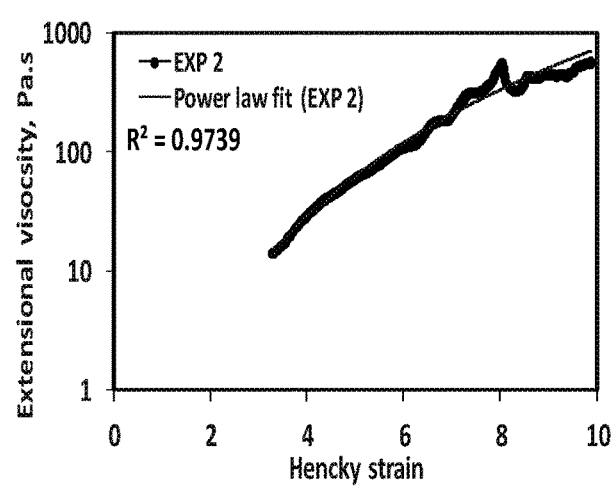
Figure 10A:
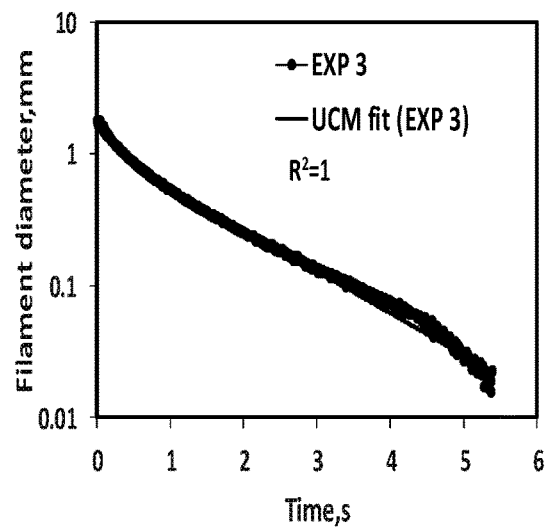
FIGS. 10A-10C show graphs of Filament diameter vs time plot for EXP 3 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 10B:
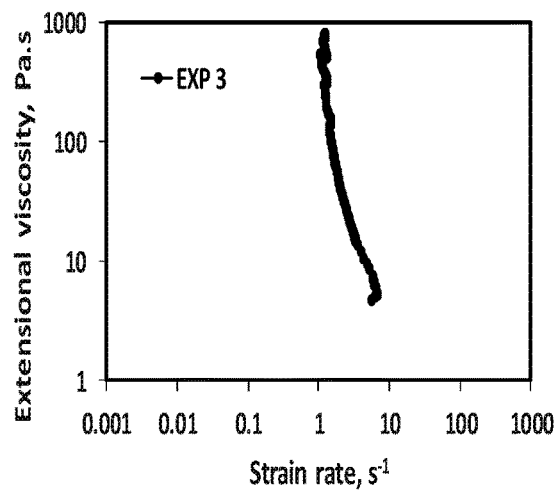
Figure 10C:
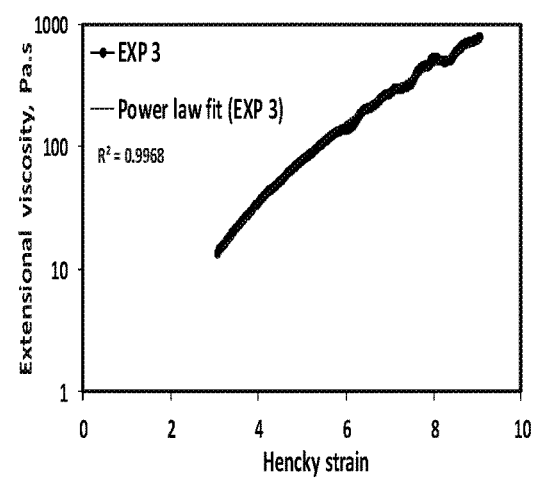
Figure 11A:
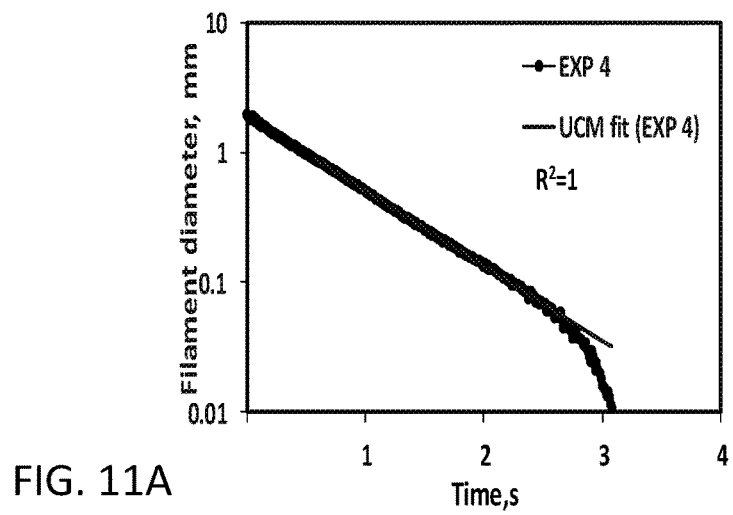
FIGS. 11A-11C show graphs of Filament diameter vs time plot for EXP 4 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 11B:
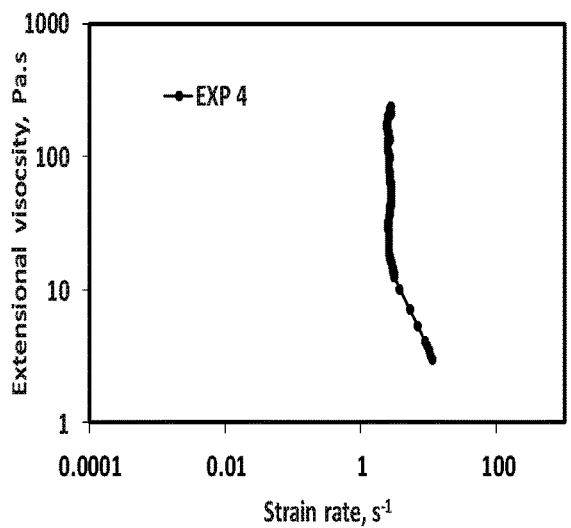
Figure 11C:
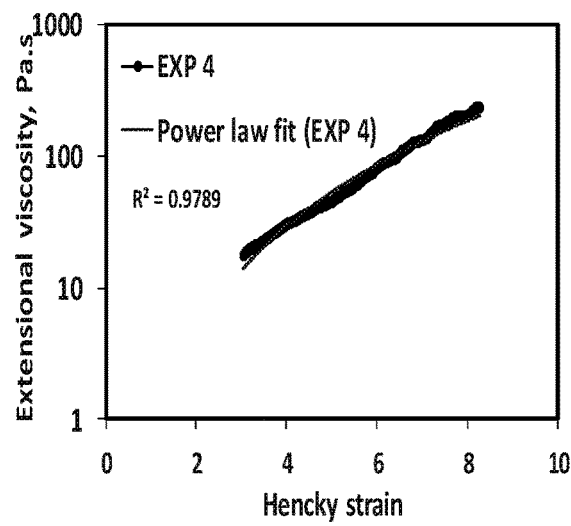
Figure 12A:
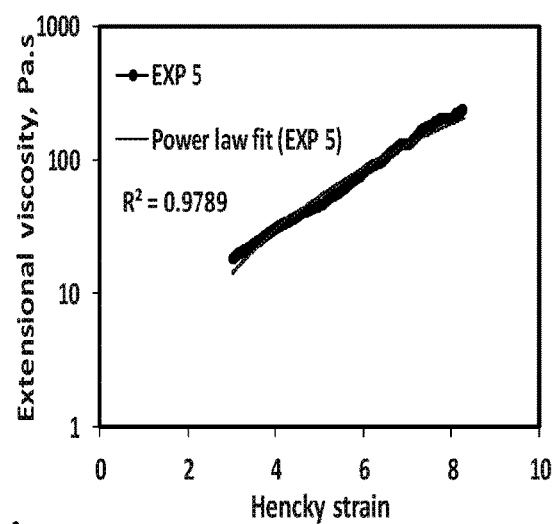
FIGS. 12A-12C show graphs of Filament diameter vs time plot for EXP 5 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 12B:
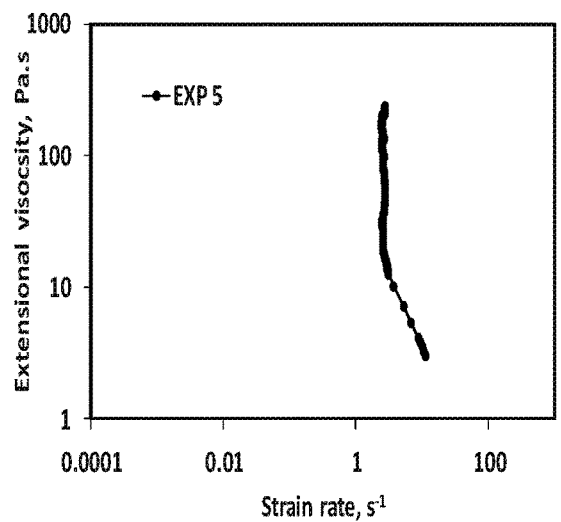
Figure 12C:
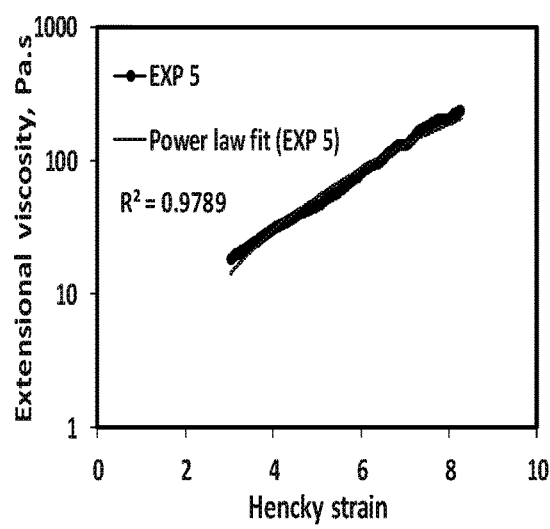
Figure 13:
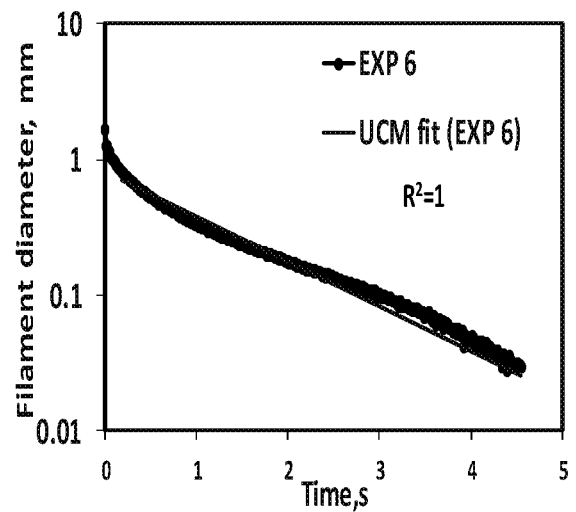
FIGS. 13A-13C show graphs of Filament diameter vs time plot for EXP 6 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 13B:
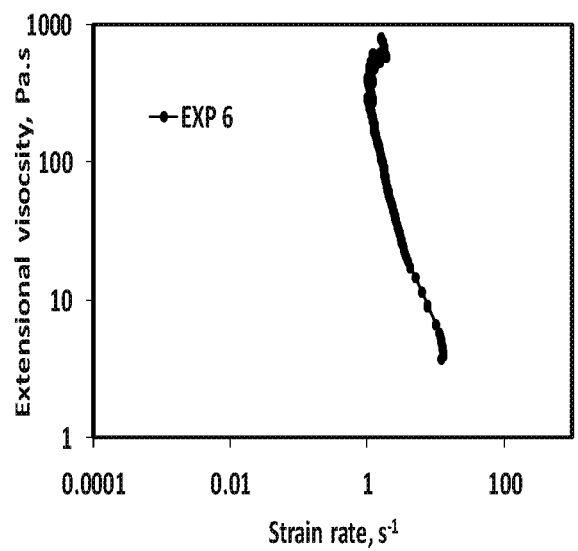
Figure 13C:
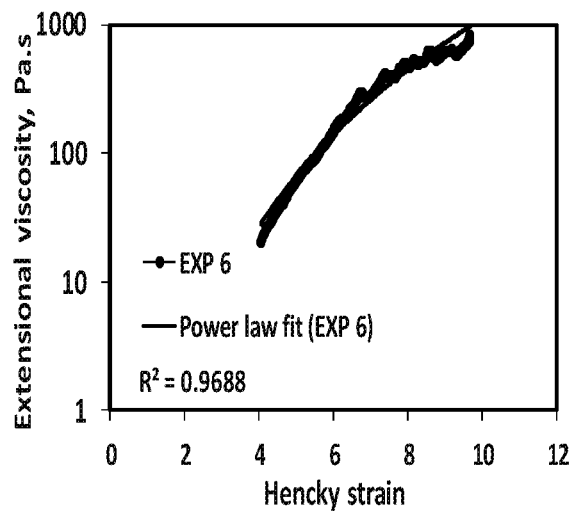
Figure 14A:
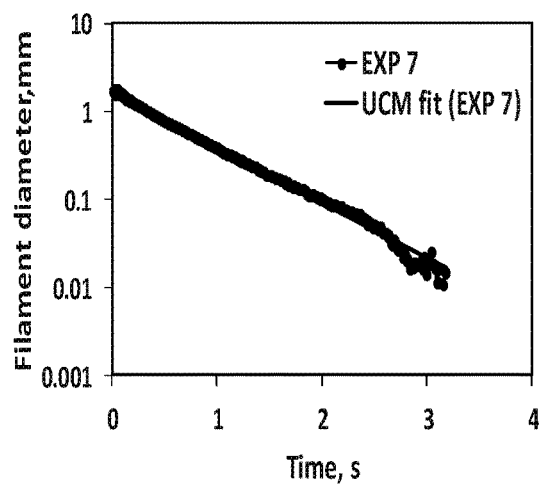
FIGS. 14A-14C show graphs of Filament diameter vs time plot for EXP 7 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 14B:
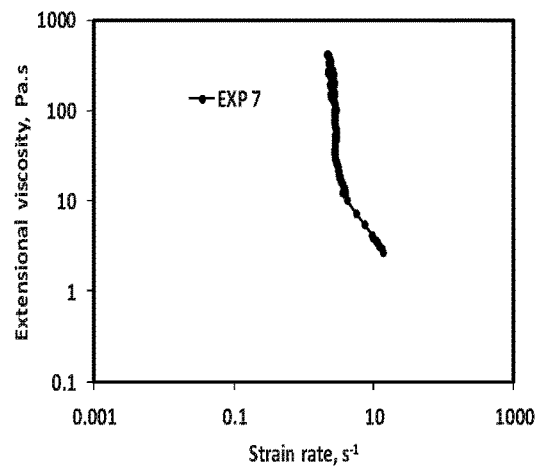
Figure 14C:
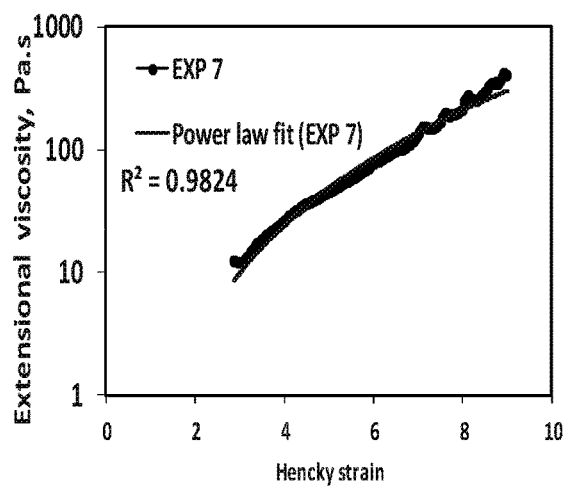
Figure 15A:
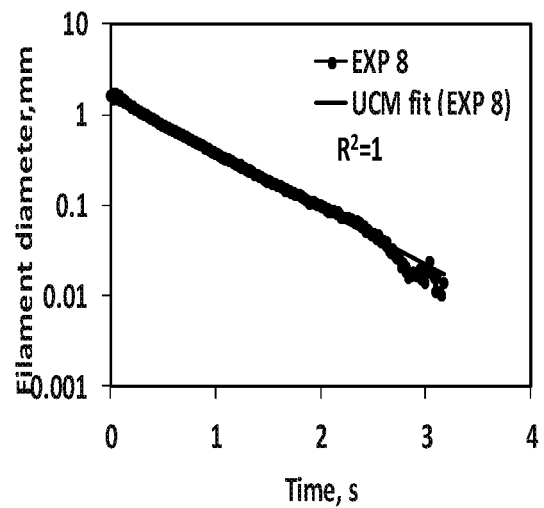
FIGS. 15A-15C show graphs of Filament diameter vs time plot for EXP 8 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 15B:
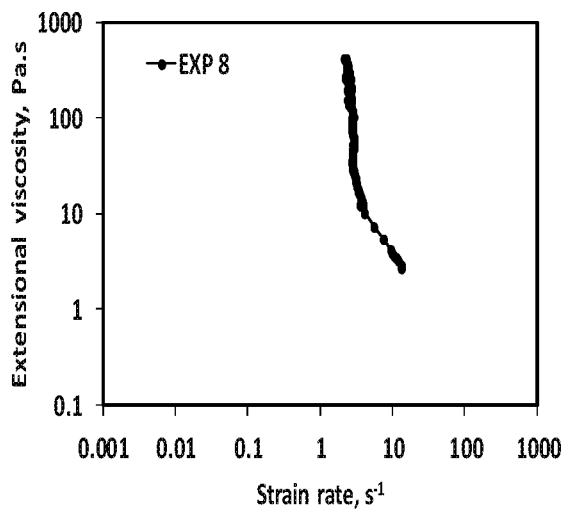
Figure 15C:
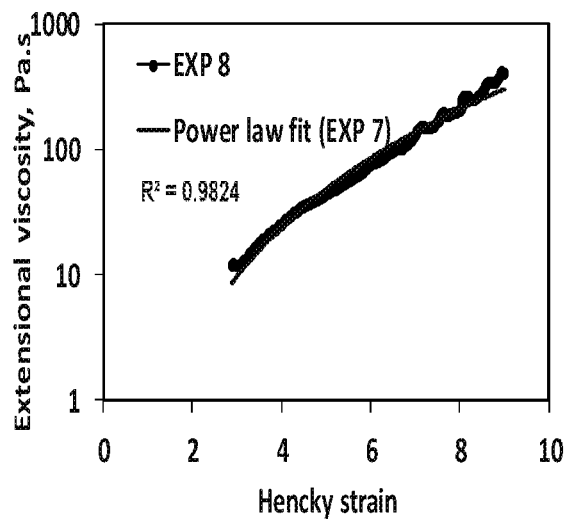
Figure 16A:
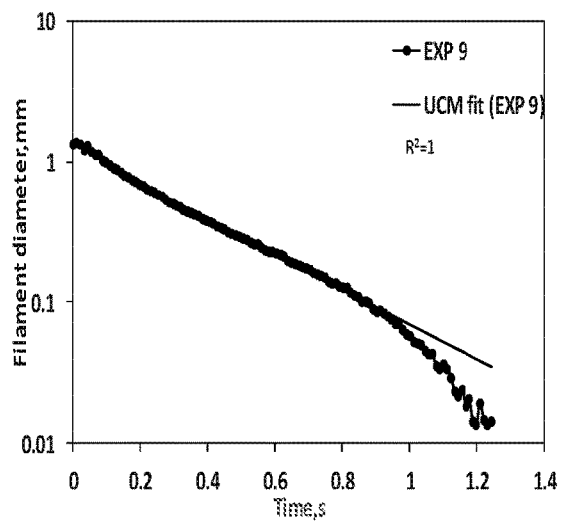
FIGS. 16A-16C show graphs of Filament diameter vs time plot for EXP 9 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 16B:
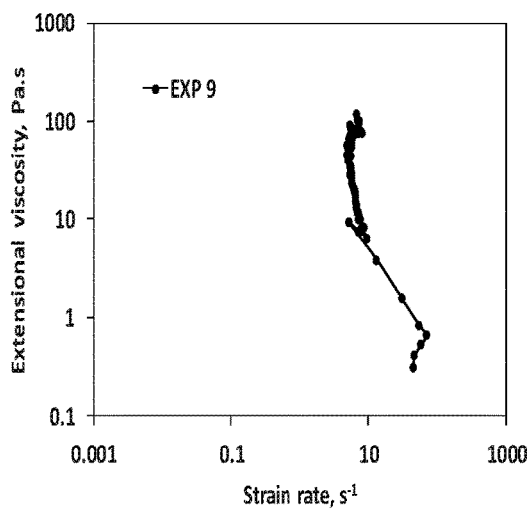
Figure 16C:
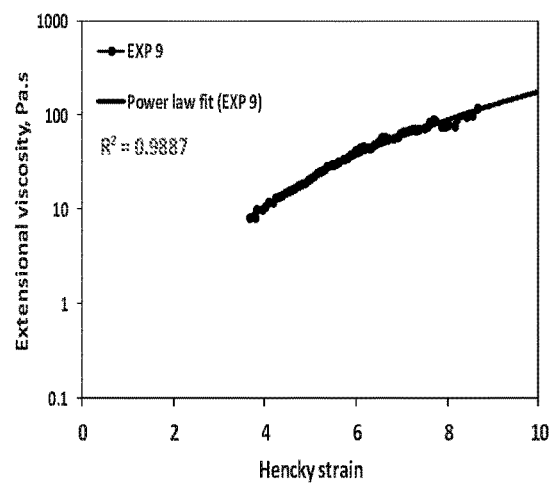
Figure 18A:
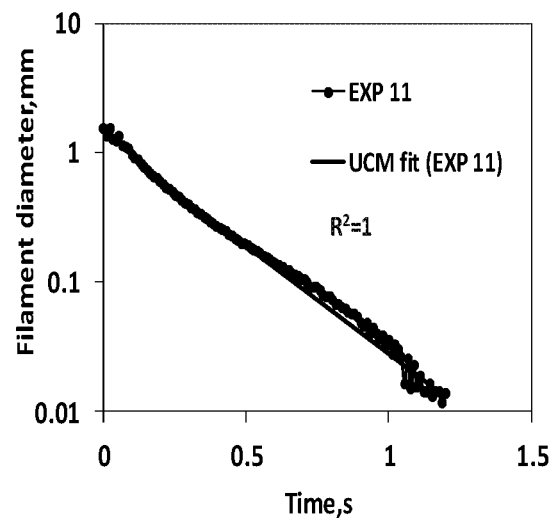
FIGS. 18A-18C show graphs of Filament diameter vs time plot for EXP 11 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 18B:
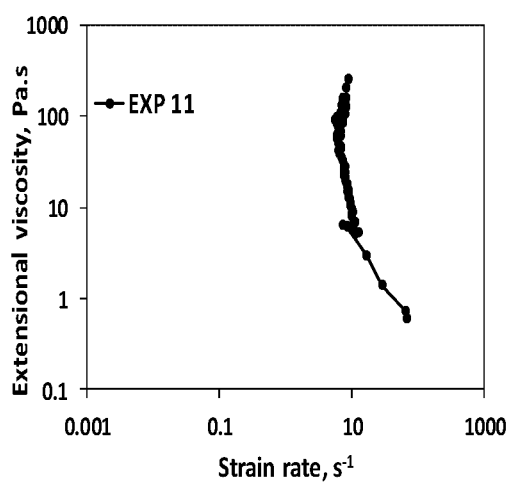
Figure 18C:
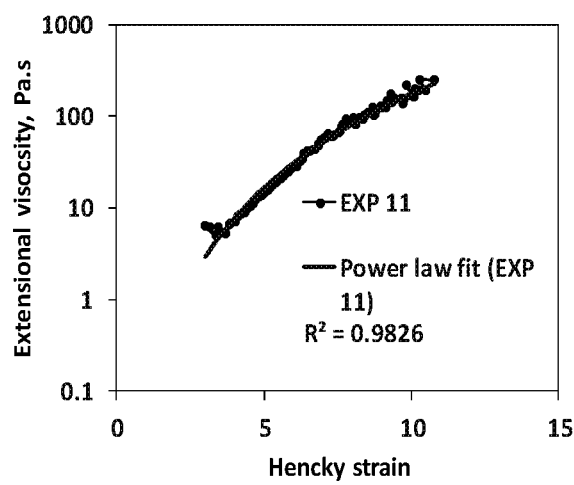
Figure 19A:
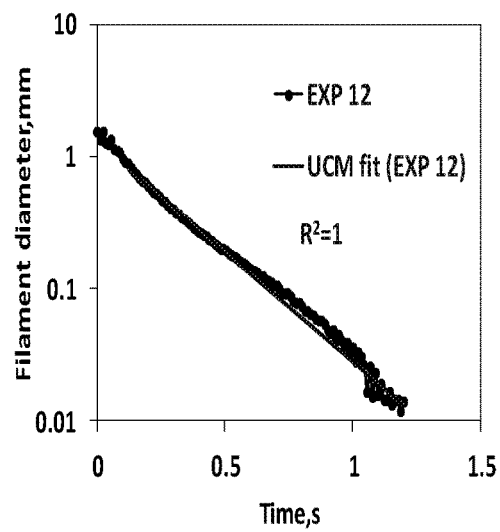
FIGS. 19A-19C show graphs of Filament diameter vs time plot for EXP 12 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 19B:
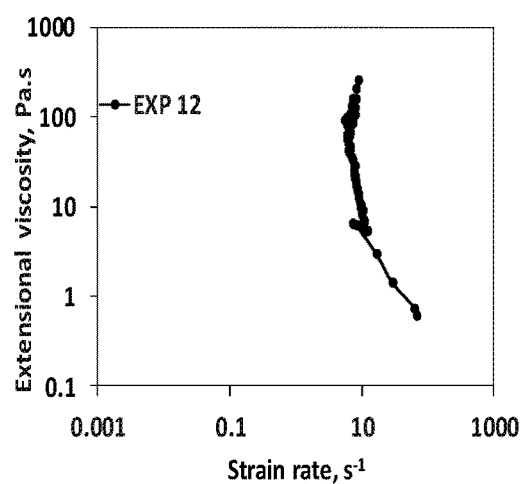
Figure 19C:
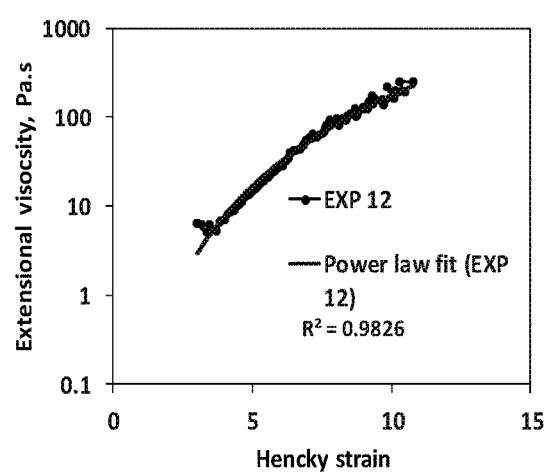
Figure 20A:
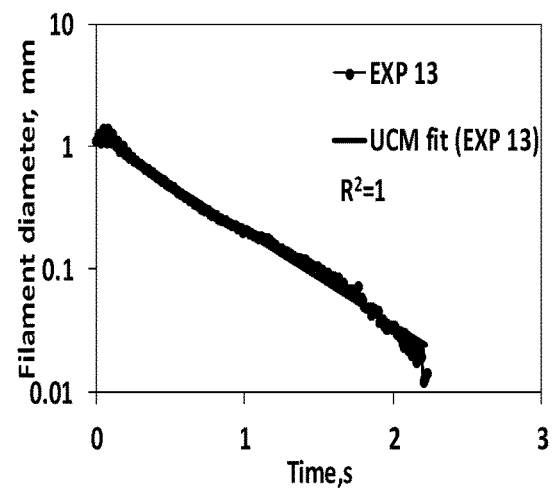
FIGS. 20A-20C show graphs of Filament diameter vs time plot for EXP 13 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 20B:
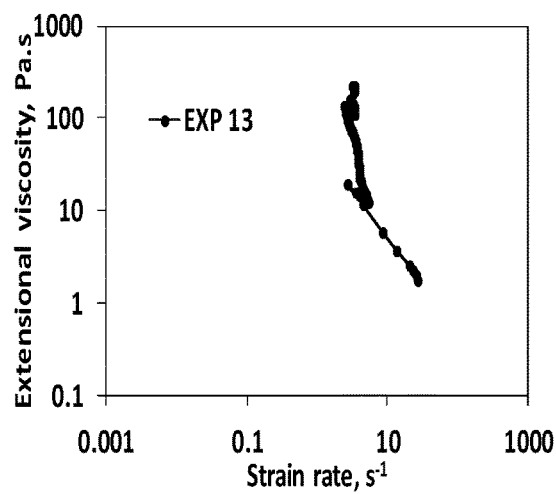
Figure 20C:
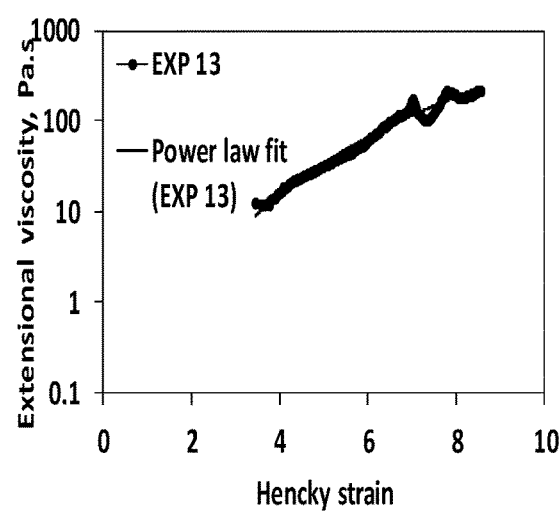
Figure 21A:
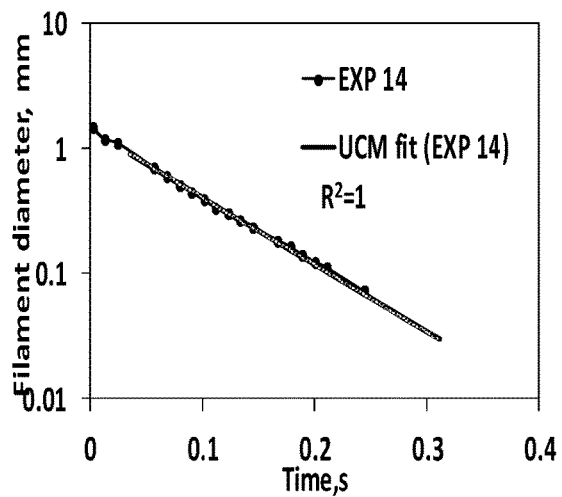
FIGS. 21A-21C show graphs of Filament diameter vs time plot for EXP 14 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 21B:
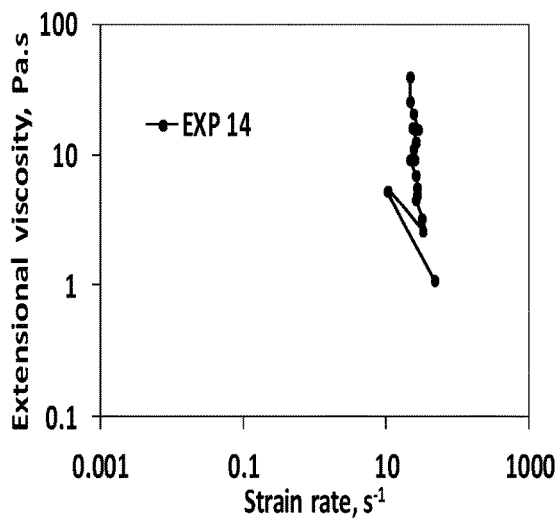
Figure 21C:
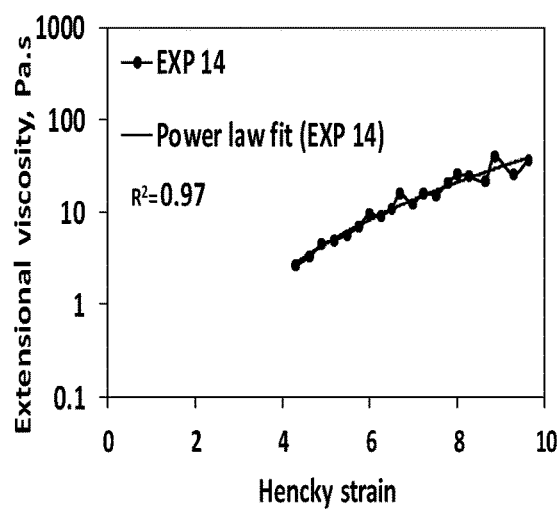
Figure 22A:
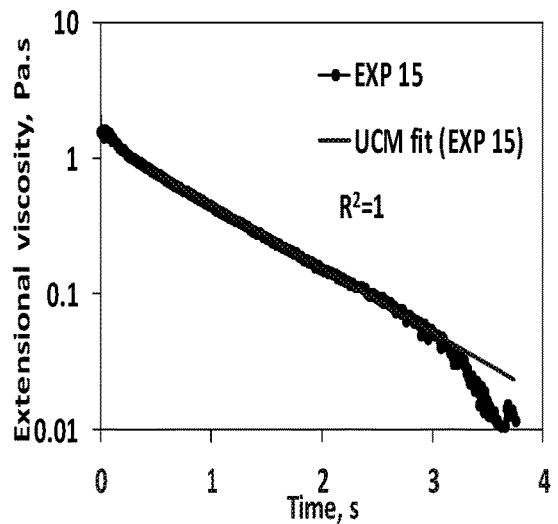
FIGS. 22A-22C show graphs of Filament diameter vs time plot for EXP 15 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 22B:
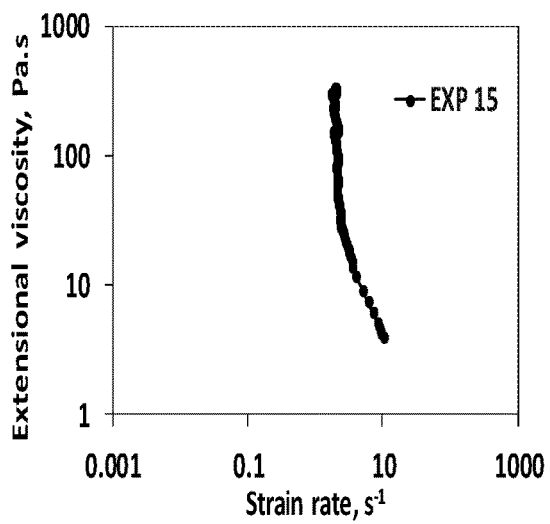
Figure 22C:
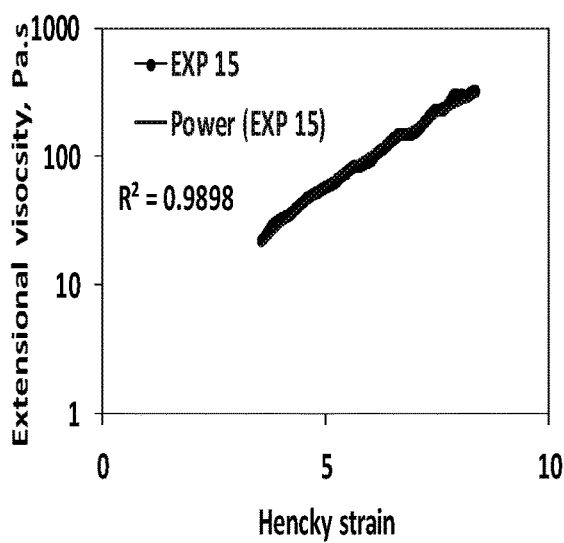
Figure 23A:
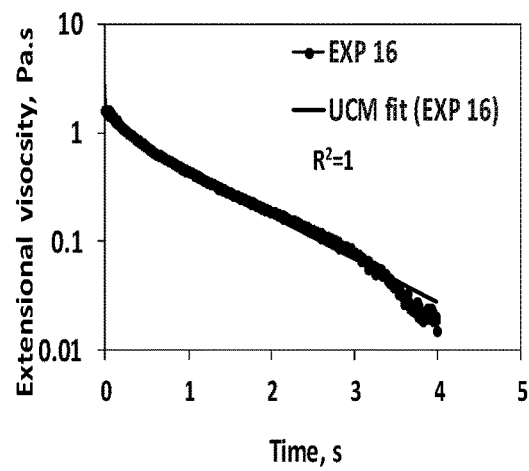
FIGS. 23A-23C show graphs of Filament diameter vs time plot for EXP 16 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 23B:
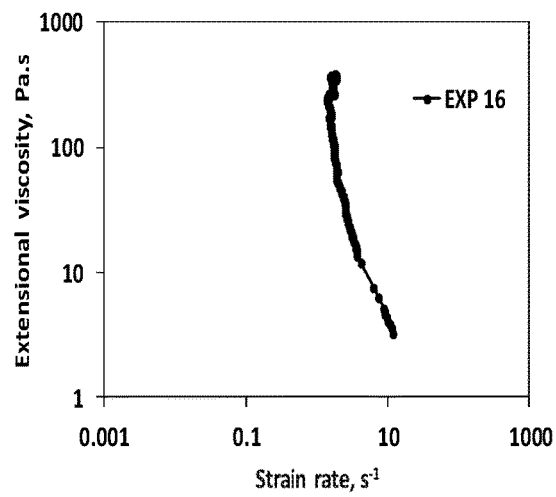
Figure 23C:
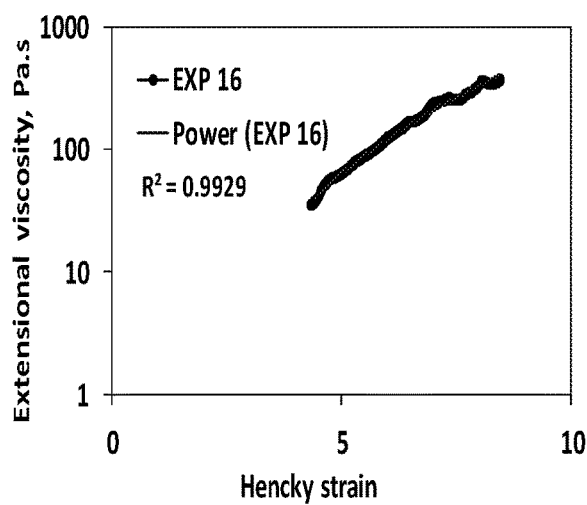
Figure 24A:
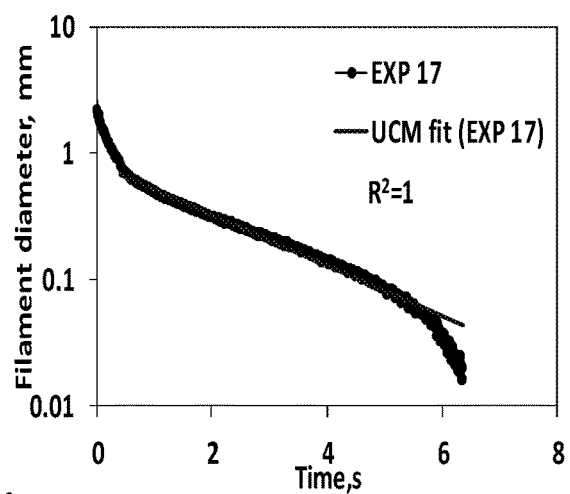
FIGS. 24A-24C show graphs of Filament diameter vs time plot for EXP 17 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 24B:
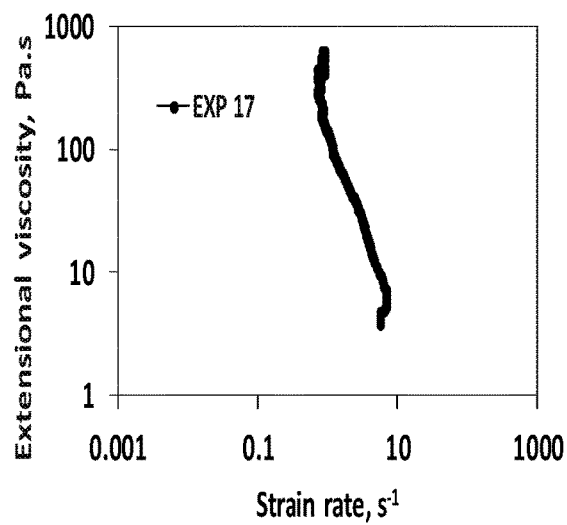
Figure 24C:
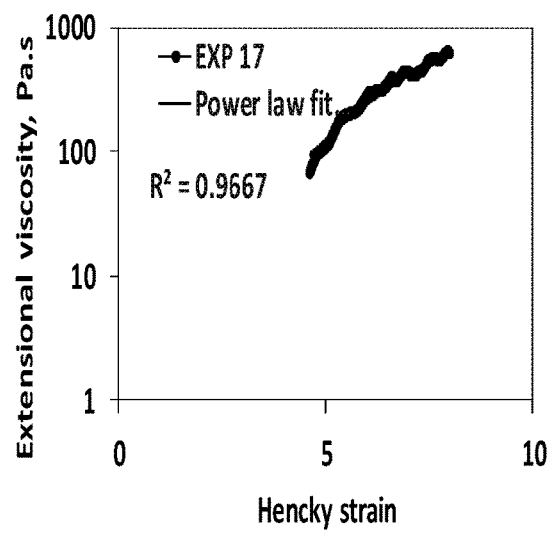
Figure 25A:
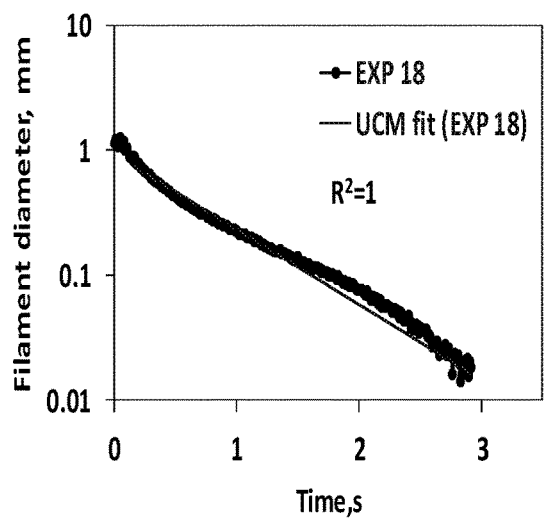
FIGS. 25A-25C show graphs of Filament diameter vs time plot for EXP 18 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 25B:
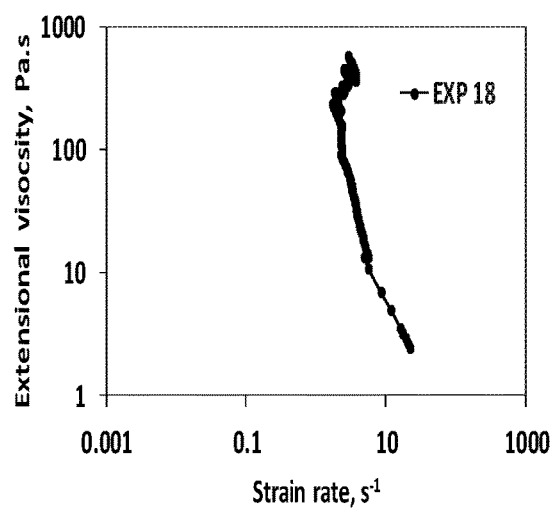
Figure 25C:
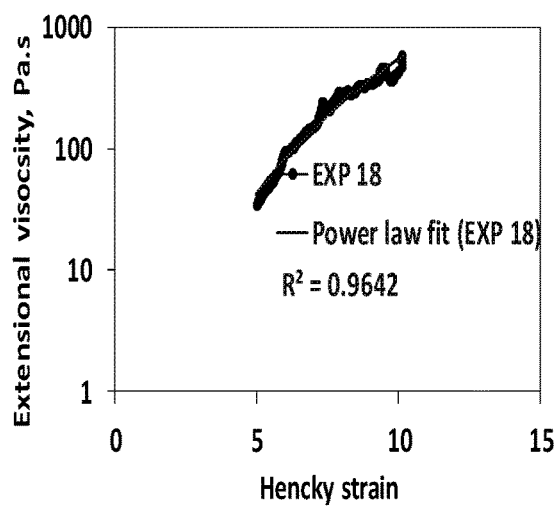
Figure 26A:
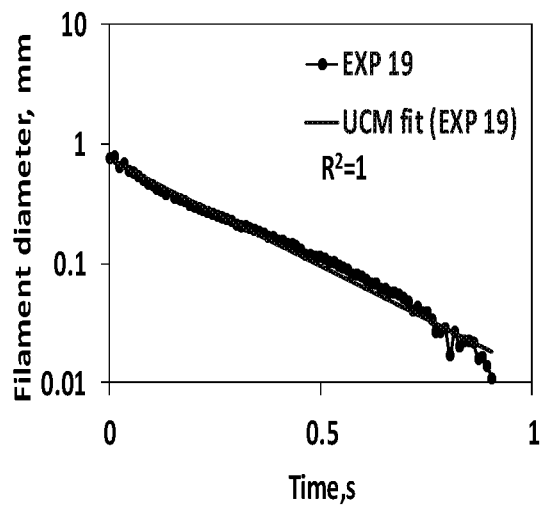
FIGS. 26A-26C show graphs of Filament diameter vs time plot for EXP 19 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 26B:
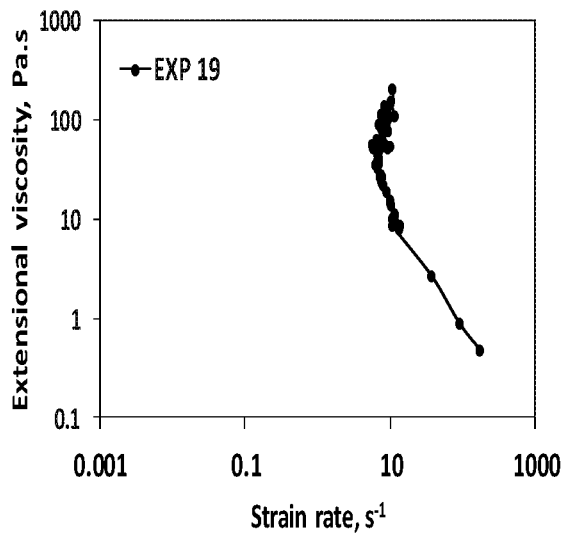
Figure 26C:
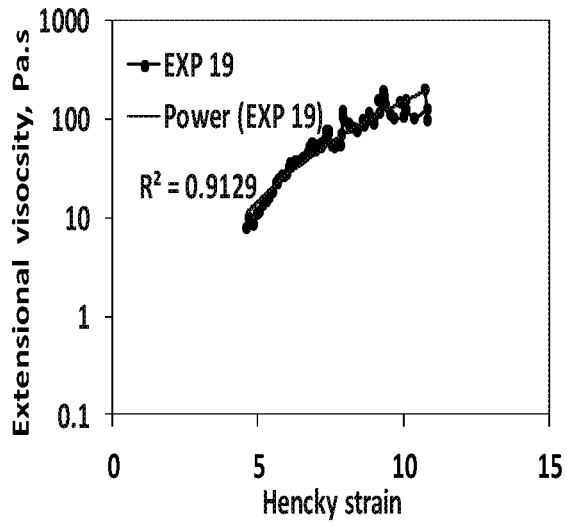
Figure 27A:
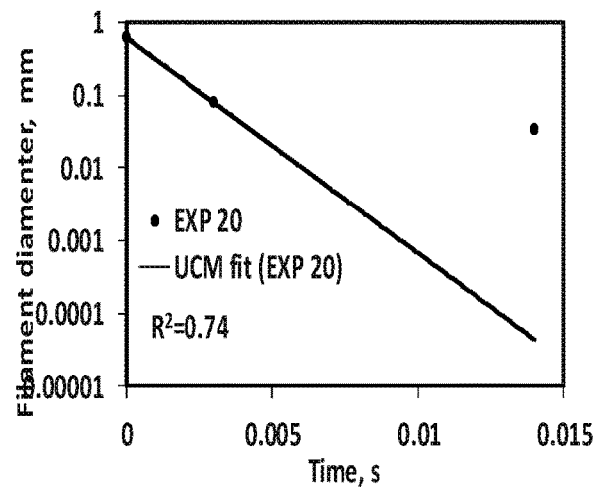
FIGS. 27A-27C show graphs of Filament diameter vs time plot for EXP 20 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 27B:
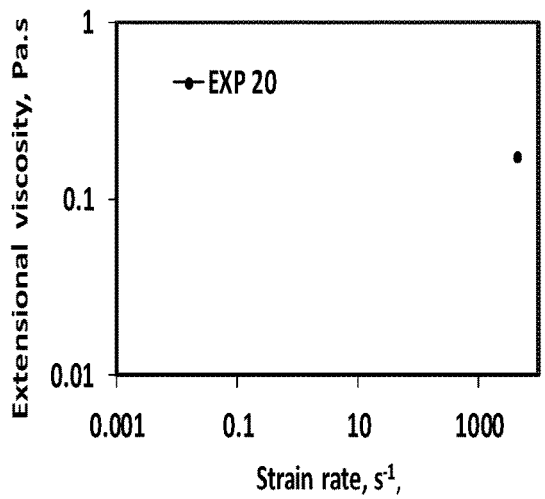
Figure 27C:
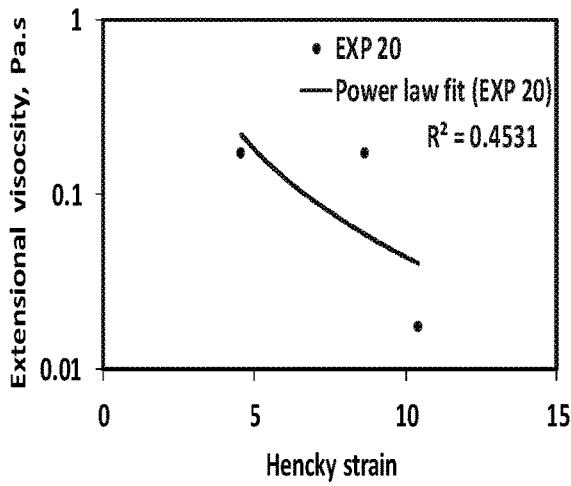
Figure 28A:
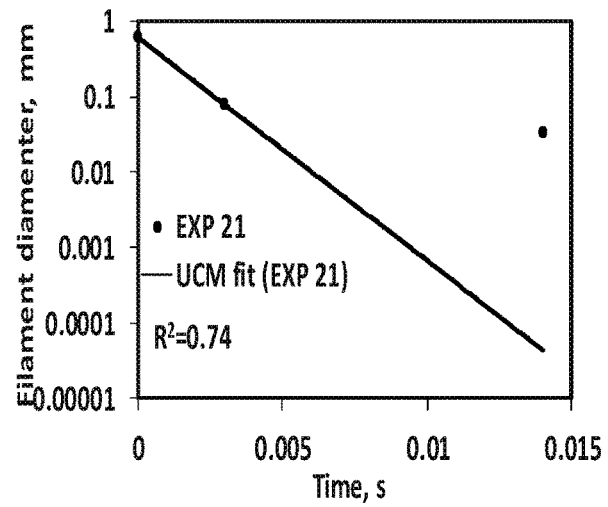
FIGS. 28A-28C show graphs of Filament diameter vs time plot for EXP 21 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 28B:
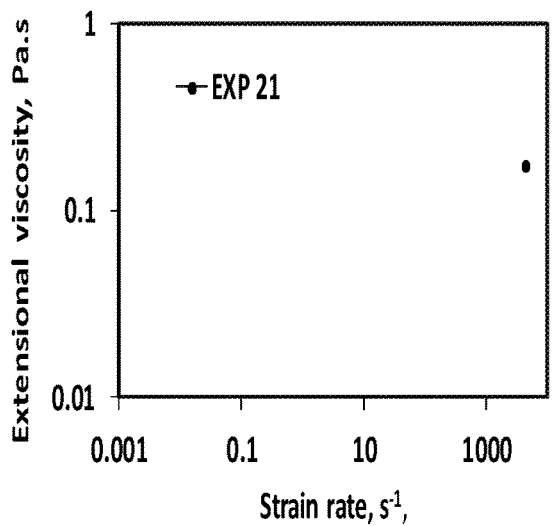
Figure 28C:
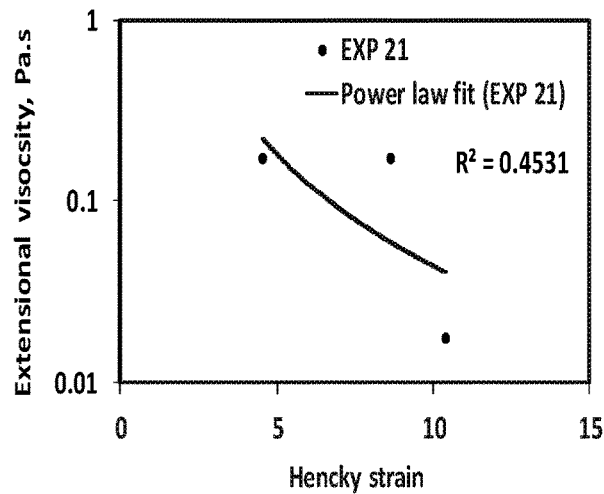
Figure 29A:
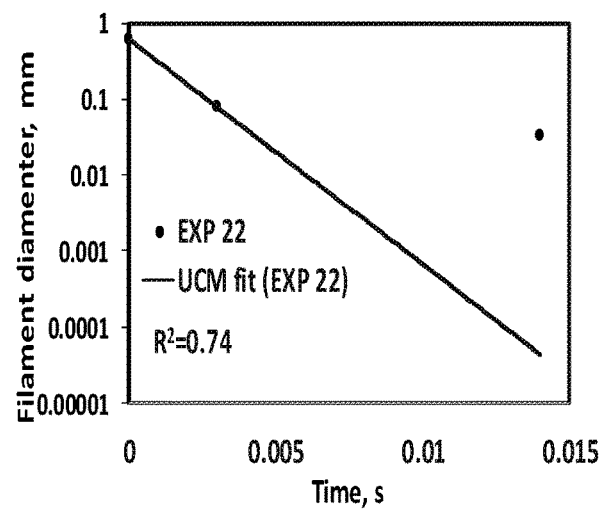
FIGS. 29A-29C show graphs of Filament diameter vs time plot for EXP 22 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 29B:
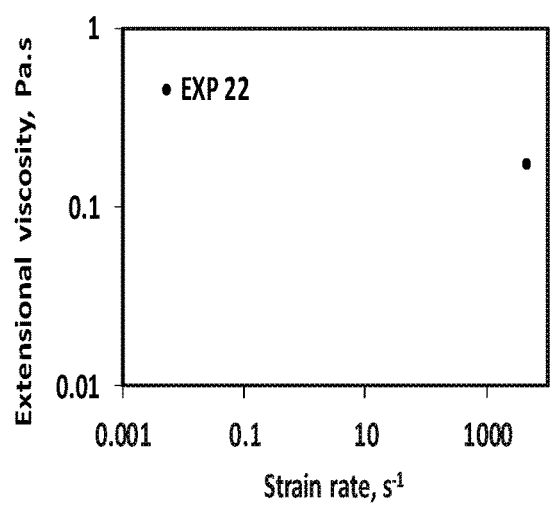
Figure 29C:
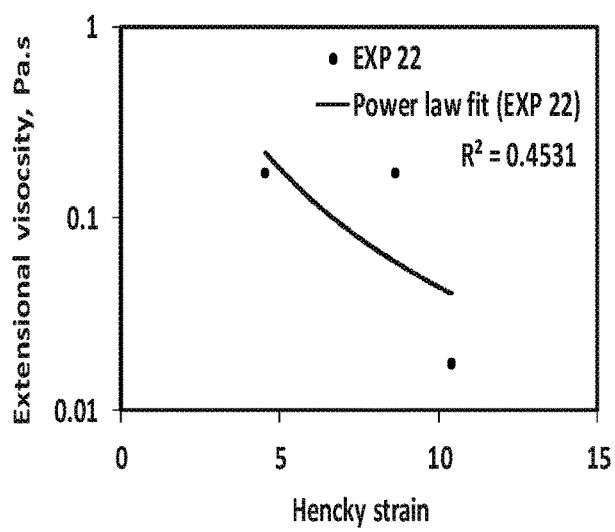
Figure 30A:
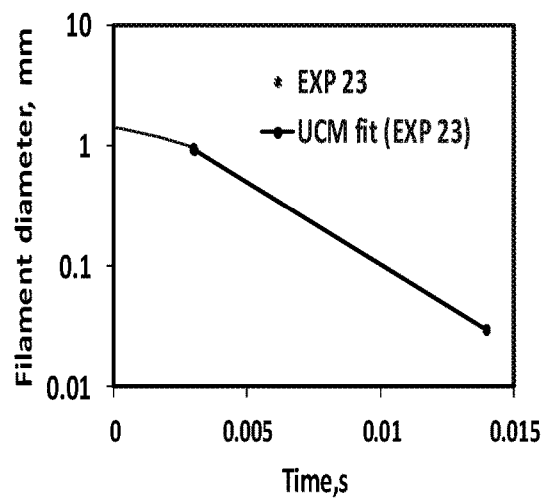
FIGS. 30A-30C show graphs of Filament diameter vs time plot for EXP 23 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 30B:
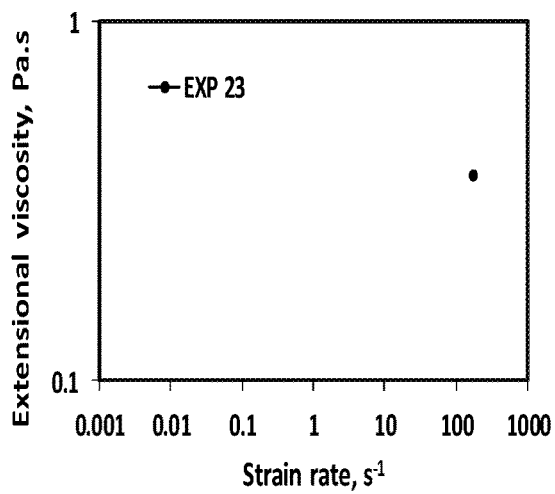
Figure 30C:
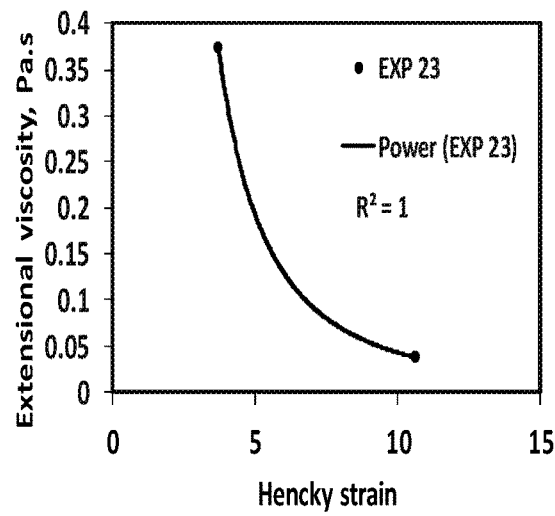

It is important to point out here that strain rates are self-selected by the polymer solutions. Initially, the strain rate is high then drops to lower value due the gravitational sagging. This is shown as regime 1 in the FIG. 2. Regime 1 doesn't represent any material property of polymer solutions. Once the filament is formed, the capillary action tends to break the filament. However, the viscosity and elasticity of the polymer solutions tend to resist the capillary action. Initially, the capillary action is resisted by the polymer's viscosity. Since viscosity is a relatively weaker property, the polymer solutions tend to deform which causes the strain rate to increase (Clasen 2010). This is shown as regime 2 in the FIG. 2. Strain rate increases until the elasticity of polymer solutions begins to resist the capillary action. Since the elasticity is a more potent property, strain rate drops and approaches the asymptotic value around the critical Deborah number of 0.66 (Entov and Hinch 1997; Clasen et al. 2006; Clasen 2010). The asymptotic drop in the strain rate to the critical Deborah number results in the sharp increase in the extensional viscosity (Kim et al. 2010; Clasen 2010). This phenomenon is shown as regime 3 in the FIG. 2. The maximum extensional viscosity around the critical Deborah number ($\mu_{max@Decr}$) corresponds to the elastic limit of the polymer solutions (Clasen 2010). The product of critical strain rate and extensional relaxation time corresponds to the critical Deborah number of 0.66. Therefore, the critical strain rate can be found by dividing 0.66 by the polymer's relaxation time. For more details about the extensional viscositystrain rate plot, readers are encouraged to read our earlier publication (Azad and Trivedi 2019a; Azad and Trivedi 2019c). $\mu_{max@Dec}$ for all the solutions are reported (Table 1). $\mu_{max@Dec}$ is significantly higher for the viscoelastic polymer solutions than glycerin. For example, HPAM 3630 used in Experiment 1 corresponds to the $\mu_{max@Dec}$ of 648,000 cP (FIG. 9B and Table 1). The glycerin used in Experiment 23 corresponds to $\mu_{max@Dec}$ of only 374 cP (FIG. 30B and Table 1).

Power law theory for strain hardening index: Extensional viscosity ($\mu$;<2) as a function of strain, calculated using Equation 2 and Equation 4 for all the data sets are shown in FIG. 8C to 30C.

$$\varepsilon(t) = 2\ln\left(\frac{D_o}{D_{mtd}(t)}\right) \quad \text{Equation 4}$$

where
$\varepsilon$=Hencky strain,

The strain hardening index ($n_2$) gives a measure of the polymer thickening ability in the extensional field. $n_2$ is determined by using power law fit to the extensional viscosity vs. strain values around the critical $D_e$. $n_2$ is negative for glycerin (Table 1) because it fails to show thickening (FIG. S-23c). All the viscoelastic polymer solutions show thickening (FIG. 8C to FIG. 26C). Therefore, $n_2$ for all of them are positive (Table 1). These results clearly imply that elastic solutions possess more resistance than viscous solutions in the extensional field. However, in the oscillatory field, viscous and elastic polymer solutions may possess similar resistance (Garrouch and Gharbi 2006).

$S_{or}$ reduction values from literature data: The correlation relating the $S_{or}$ and $N_{ce}$ during viscoelastic polymer flooding is developed using 23 different data sets. Only the data sets from the polymer flood experiments that are conducted for an extended period for attaining $S_{or}$ are selected. Polymer flood conducted using very low pore volumes of injections are not included. The data sets are chosen only from the tertiary polymer flooding conducted between the flux rate of 0.2 ft/day to 5 ft/day. Most of the experiments are conducted at the flux rate of 1 ft/day. Polymer flood experiments conducted with carbonate formation and micro-model are excluded. $S_{or}$ corresponding to the water flood and glycerin flood is also included. All the experimental and petrophysical details pertaining to the different polymer, glycerin and water flooding can be found in Table 3. $S_{or}$ data corresponding these data sets are also reported in the Table 3. Shear rheological parameters and IFT values, taken from the literature, are also reported in Table 3.

TABLE 3

Petrophysical properties of various polymer flood experiments along with pore-scale and core-scale parameters

| EXP | Authors | Formation | $\varphi$ | k (mD) | $\mu_o$ (cP) | v (ft/day) | $\mu_{app-po}$ (cP) | $\mu_{app-co}$ (cP) |
|---|---|---|---|---|---|---|---|---|
| 1 | Qi et al. (2017) | Bentheimer Sandstone | 0.22 | 2200 | 120 | 0.96 | 168455 | 34.8 |
| 2 | Qi et al. (2017) | Bentheimer Sandstone | 0.22 | 2100 | 120 | 0.2 | 25504 | 63.4 |
| 3 | Erinick et al. (2018) | Bentheimer Sandstone | 0.24 | 1480 | 126 | 4 | 493822 | 25 |
| 4 | Erinick et al. (2018) | Bentheimer Sandstone | 0.24 | 1480 | 126 | 2 | 54214 | 39 |
| 5 | Erinick et al. (2018) | Bentheimer Sandstone | 0.25 | 1480 | 114 | 1 | 29728 | 56 |
| 6 | Erinick et al. (2018) | Bentheimer Sandstone | 0.25 | 1480 | 114 | 1 | 243978 | 52 |
| 7 | Ehrenfried (2013) | Bentheimer Sandstone | 0.23 | 2398 | 149 | 5.28 | 176117 | N.A |
| 8 | Ehrenfried (2013) | Bentheimer Sandstone | 0.23 | 2125 | 162 | 1.06 | 51033 | N.A |
| 9 | Ehrenfried (2013) | Bentheimer Sandstone | 0.23 | 1597 | 162 | 1.07 | 8893 | N.A |
| 10 | Ehrenfried (2013) | Berea Sandstone | 0.18 | 187 | 300 | 1.33 | 56734 | N.A |
| 11 | Ehrenfried (2013) | Berea Sandstone | 0.18 | 169 | 300 | 0.14 | 7367 | N.A |
| 12 | Ehrenfried (2013) | Boise Sandstone | 0.27 | 475 | 300 | 0.91 | 22259 | N.A |
| 13 | Clarke et al. (2015) | Berea Sandstone | 0.23 | 435 | 34 | 1 | 47527 | 50 |
| 14 | Clarke et al. (2015) | Berea Sandstone | 0.23 | 465 | 34 | 1 | 1446 | 70 |
| 15 | Koh et al. (2017) | Ottawa Sand | 0.35 | 7900 | 80 | 1 | 22308 | 16 |
| 16 | Koh et al. (2017) | Ottawa Sand | 0.36 | 6650 | 120 | 1 | 36251 | 28 |
| 17 | Koh et al. (2017) | Ottawa Sand | 0.37 | 7311 | 250 | 1 | 109012 | 108 |
| 18 | Koh et al. (2017) | Reservoir Sand | 0.28 | 227 | 72 | 1 | 184600 | 12 |
| 19 | Cottin et al. (2014) | Sandstone Reservoir | 0.359 | 2943 | 7 | 3 | 18660 | NA |
| 20 | Clarke et al. (2015) | Berea Sandstone | 0.23 | 435 | 34 | 2 | 0.971 | 1 |

TABLE 3-continued

Petrophysical properties of various polymer flood experiments along with pore-scale and core-scale parameters

| | | | | | | | | |
|---|---|---|---|---|---|---|---|---|
| 21 | Clarke et al. (2015) | Berea Sandstone | 0.23 | 465 | 34 | 2 | 0.972 | 1 |
| 22 | Erinick et al. (2018) | Bentheimer Sandstone | 0.25 | 1480 | 114 | 4.7 | 0.96 | NA |
| 23 | Erinick et al. (2018) | Bentheimer Sandstone | 0.25 | 1480 | 114 | 2 | 56.28 | 57 |

| EXP | $\sigma_i$ (mN/m) | dP/L (psi/ft.) | $N_{ce}$ | $N_{c1}$ | $N_{c2}$ | $D_e$ | $S_{or}$ |
|---|---|---|---|---|---|---|---|
| 1 | 17.3 | 10 | $3.29*10^{-2}$ | $2.83*10^{-5}$ | NA | 14.8 | 0.198 |
| 2 | 17.3 | 3 | $1*10^{-3}$ | $8.11*10^{-6}$ | NA | 0.6 | 0.31 |
| 3 | 17.3 | 30.6 | 0.402 | $5.8*10^{-5}$ | NA | 11 | 0.08 |
| 4 | 17.3 | 29.1 | $2.21*10^{-2}$ | $5.6*10^{-5}$ | NA | 100 | 0.29 |
| 5 | 17.3 | 23.9 | $6.06*10^{-3}$ | $4.6*10^{-5}$ | NA | 32 | 0.32 |
| 6 | 17.3 | 12.4 | $4.97*10^{-2}$ | $2.4*10^{-5}$ | NA | 6 | 0.22 |
| 7 | 25 | 28.03 | $1.31*10^{-1}$ | $6.03*10^{-5}$ | $6.47*10^{-6}$ | 4.34 | 0.151 |
| 8 | 25 | 15.03 | $7.63*10^{-3}$ | $2.85*10^{-5}$ | $1.38*10^{-6}$ | 2.18 | 0.289 |
| 9 | 25 | 11.51 | $1.34*10^{-3}$ | $1.64*10^{-5}$ | $1.31*10^{-6}$ | 72.91 | 0.297 |
| 10 | 25 | 83.07 | $1.06*10^{-2}$ | $1.39*10^{-5}$ | $7.33*10^{-7}$ | 0.38 | 0.337 |
| 11 | 25 | 94.73 | $1.4*10^{-4}$ | $1.43*10^{-5}$ | $7.88*10^{-8}$ | 0.29 | 0.4 |
| 12 | 25 | 52.7 | $2.85*10^{-3}$ | $2.25*10^{-5}$ | $6.72*10^{-7}$ | 1.46 | 0.366 |
| 13 | 25 | N.A | $6.7*10^{-3}$ | NA | $7.05*10^{-6}$ | 2.2 | 0.32 |
| 14 | 25 | N.A | $2*10^{-4}$ | NA | $9.85*10^{-6}$ | 0.021 | 0.42 |
| 15 | 13.5 | N.A | $5.8*10^{-3}$ | $6*10^{-7}$ | NA | 2.94 | 0.26 |
| 16 | 13.5 | N.A | $9.47*10^{-3}$ | $1.7*10^{-6}$ | NA | 4.2 | 0.24 |
| 17 | 13.5 | N.A | $2.8*10^{-2}$ | $4.1*10^{-6}$ | NA | 16 | 0.23 |
| 18 | 13.5 | N.A | $4.8*10^{-2}$ | $5.5*10^{-7}$ | NA | 6.5 | 0.24 |
| 19 | 17.5 | N.A | $1.1*10^{-2}$ | $1*10^{-5}$ | NA | NA | 0.24 |
| 20 | 1 | N.A | $6.852*10^{-6}$ | NA | $7.06*10^{-6}$ | NA | 0.45 |
| 21 | 1 | N.A | $6.858*10^{-6}$ | NA | $7.06*10^{-6}$ | NA | 0.45 |
| 22 | 15.6 | 15.7 | $1.02*10^{-6}$ | $3.33*10^{-5}$ | NA | NA | 0.45 |
| 23 | 21.3 | 33.6 | $1.864*10^{-5}$ | $5.2*10^{-5}$ | NA | NA | 0.43 |

Pore scale viscoelastic model: Since 1970s, several core-scale viscoelastic models were developed for predicting the polymer's apparent viscosity (Hirasakhi and Pope 1974; Masuda et al. 1992, Delshad et al. 2008). Unified apparent viscosity (UVM), a core-scale model was successfully used to match the viscoelastic polymer's injectivity (Lotfollahi et al. 2015). Another key feature of viscoelastic polymer is their ability to reduce the $S_{or}$. The inability of viscoelastic models to account the reduction in $S_{or}$ at low flux has been reported (Qi et al. 2018; Azad and Trivedi 2019b). Deborah number has been used to account the reduction in $S_{or}$ during viscoelastic polymer flooding at low fluxes (Qi et al. 2017; Qi et al. 2018). Relaxation time attained in the oscillatory shear field is used in the calculation of Deborah number (Qi et al. 2017; Qi et al. 2018). Azad and Trivedi (2019b) highlighted the limitation of using oscillatory relaxation time for quantifying the polymer's viscoelastic effects on $S_{or}$ reduction at saline conditions. At the porescale, polymer solutions are subjected to 75% elongational deformation (Hass and Durst 1984) and it is important to allot similar weightage to extensional viscosity. A model is presented in Equation 5 that can provide an estimate on the polymer's apparent in-situ viscosity at the pore-scale. The input required by this model to predict the pore-scale apparent viscosity are bulk shear rheological parameters, bulk extensional rheological parameters, petrophysical properties such as permeability, porosity and flux rates. Pore-scale apparent viscosity ($\mu_{app-pore}$) for all the experiments, calculated using the Equation 5 is reported in Table 3.

$$\mu_{app-pore} = \mu_\infty + (\mu_p^o - \mu_\infty)[1 + (\lambda*\gamma)^\alpha]^{\frac{(n-1)}{\alpha}} + \\ 0.75*\mu_{max}[1 - \exp(-(\beta*\tau_{ext}*\gamma*n_2))]$$

Equation 5 where $\mu_{app-pore}$=Apparent viscosity at the pore-scale, cP
$\mu_\infty$=Infinite shear viscosity, cP
$\mu_p^o$=Zero shear viscosity, cP
$\lambda$=Shear characteristic time, s
$\gamma$=Apparent shear rate, s$^{-1}$
$\alpha$=Correction factor, 2
n=Shear thinning index
$\mu_{max}$=Maximum elongational viscosity around the critical $D_e$, cP
$\beta$=Universal constant, 0.01
$\tau_{ext}$=Extensional relaxation time, s
$n_2$=Strain hardening index For the same flux rate, $\mu_{app-pore}$ are higher for viscoelastic polymers than viscous glycerin. HPAM 3630 used in the experiment 4 corresponds to the $\mu_{app-pore}$ of 91,818 cP in 1,480 mD bentheimer sandstone at 2 ft/day (Table 1 and 3). Whereas in experiment 23, glycerin flood conducted at 2 ft/day in 1480 mD bentheimer sandstone provides $\mu_{app-pore}$ of only 45.37 cP (Table 1 and 3). At 1 ft/day, high Mw HPAM 6040 polymer and low Mw HPAM 3130 polymer used in the experiment 13 and 14 corresponds to the $\mu_{app-pore}$ of 68,640 cP and 865 cP respectively at the similar petrophysical conditions (Table 1 and 3). Similarly, in experiment 5 and 6, HPAM 3630 solutions prepared at the salinity of 1400 ppm and 24300 ppm corresponds to the $\mu_{app-pore}$ of 28523 cP and 223658 cP respectively at the similar flux rate and petrophysical conditions (Table 1 and 3). These discussions suggest the possibility of higher pore-scale resistance for higher saline viscoelastic polymers solutions compared to low saline solutions, and higher pore-scale resistance for higher Mw polymer solutions.

Figure 3:
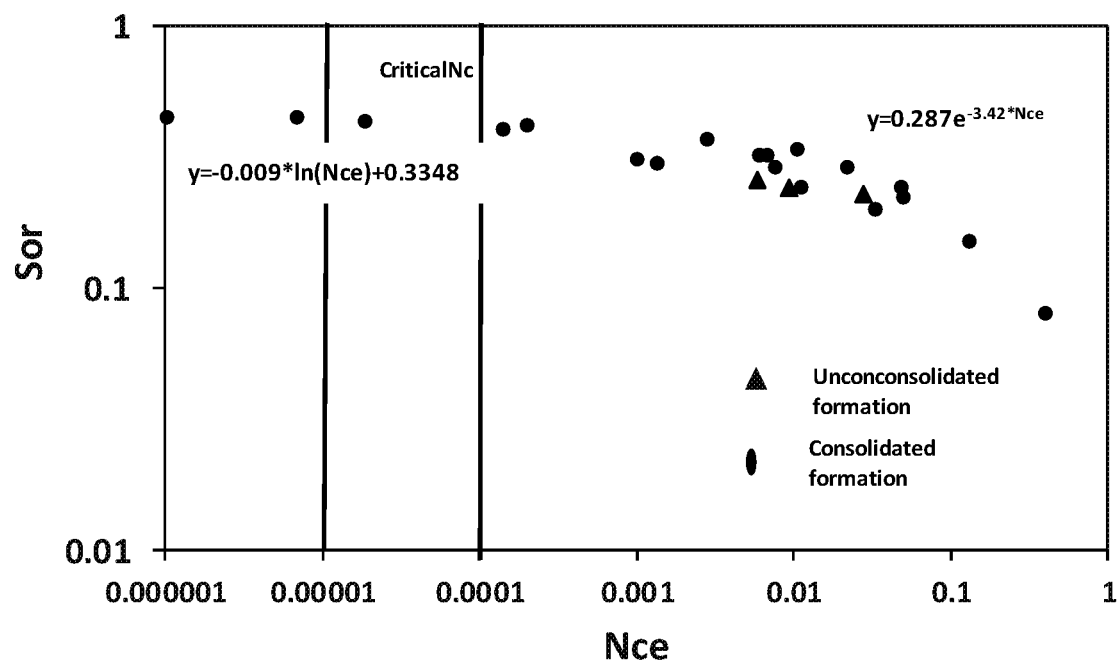
FIG. 3 is a graph showing $N_{ce}$ vs $S_{or}$ for different data sets.

Extensional Capillary Number $N_c$ can be defined by the ratio of driving viscous force to capillary force (Equation 6). In general, the higher the $N_c$, the lower the $S_{or}$. Apparent viscosity is used to represent the viscous force in the conventional $N_c$. However, apparent viscosity or conventional $N_c$ does not account for the polymer's viscoelastic forces that are responsible for $S_{or}$ reduction at the pore-scale (Azad and Trivedi 2019b). Consequently, polymers of varying elasticity contributed to different $S_{or}$ reduction at the similar $N_c$ (Ehrenfred 2013; Qi et al. 2017; Erinick et al. 2018; Azad and Trivedi 2019 b,c). Extensional viscosity of the polymer is responsible for $S_{or}$ reduction at the pore-scale (Azad and Trivedi 2019c) and it is important that the driving viscous force should incorporate extensional resistance. Therefore, a new capillary number $N_{ce}$ is presented in Eq.7 by replacing the core-scale apparent viscosity with the pore-scale apparent viscosity calculated using Equation 5. $N_{ce}$ for all the experiments calculated using the Equation 7 is also reported in the Table 3.

$$N_c = \frac{v * \mu_{app-core}}{\sigma_i} \qquad \text{Equation 6}$$

$$N_{ce} = \frac{v * \mu_{app-pore}}{\sigma_i} \qquad \text{Equation 7}$$

where $\mu_{app-core}$=The core-scale apparent viscosity, which can be calculated through core flood pressure data, cP $\sigma_i$ is the IFT, $mN \cdot m^{-1}$ v is the flux, ft/day Correlation Between $N_{ce}$ and $S_{or}$:

A correlation developed between the oscillatory Deborah number and $S_{or}$ is implemented in the UTCHEM simulator (Qi et al. 2018). The actual $S_{or}$ and $S_{or}$ predicted by Qi et al. (2018)'s correlation for the Data-set 6 are 0.22 and 0.403. At high salinity, oscillatory relaxation time becomes lower (Erinick et al. 2018) which causes the Deborah number to become lower as well. However, strain hardening, an extensional rheological parameter becomes higher for high saline polymer solutions than low saline polymer solutions despite having the lower oscillatory relaxation time (Magbagbeolo 2008). Azad and Trivedi (2019b) provided a detailed critical note on the limitation of using oscillatory relaxation time for quantifying the polymer's viscoelastic effect during EOR. It is important to incorporate extensional rheological parameters over oscillatory rheological parameters while developing a correlation for predicting the $S_{or}$. $N_{ce}$ developed using the pore-scale apparent viscosity (Equation 7) is correlated with the $S_{or}$ values at different conditions. $N_{ce}$ as a function of $S_{or}$ is shown in the FIG. 3. Both consolidated and unconsolidated formations are used (Table 1). The correlations are developed between the $N_{ce}$ and $S_{or}$. As per the classical capillary theory, an increase in the $N_c$ will not result in a drastic decrease in the $S_{or}$ up to the critical $N_c$ (Stegemeier 1974; Chatzis and Morrow 1984; Peter 2010). After the critical $N_c$, the increase in the $N_{ce}$ will result in a significant increase in the $S_{or}$ reduction. Critical $N_c$ values were reported between ~$10^{-5}$ and $10^{-4}$ (Chatzis and Morrow 1984; Stegemeier 1974; Abrahams 1975) and are highlighted in FIG. 1. $N_{ce}$ corresponding to the Experiment 18 to Experiment 23 lie on the left side of the critical $N_c$. The $N_{ce}$ value corresponding to the Experiment 4 lies closer to critical $N_c$. Displacing fluids used in these experiments are either Newtonian water, viscous glycerin, or much less elastic HPAM polymer (Table 1 and 3). There is no significant increase in the $S_{or}$ reduction with the increase in the $N_{ce}$ values up to critical $N_c$. The logarithmic fit made from these data is represented by Equation 8. $N_{ce}$ values of the remaining 17 data sets are higher than critical $N_c$ values. A clear trend is seen between $N_{ce}$ and $S_{or}$. An increase in $N_{ce}$ value results in a significant decrease in the $S_{or}$ reduction. The relation between the $N_{ce}$ and $S_{or}$ after critical $N_c$ is best fitted with the exponential function (Equation 9).

For $N_{ce}$ less than critical $N_c$, $$S_{or} = -0.007 * \ln(N_{ce}) + 0.3523 \qquad \text{Equation 8:}$$

For $N_{ce}$ greater than critical $N_c$.

$$S_{or} = 0.308 * \text{Exp}(-3.604 * N_{ce})$$

Figure 4:
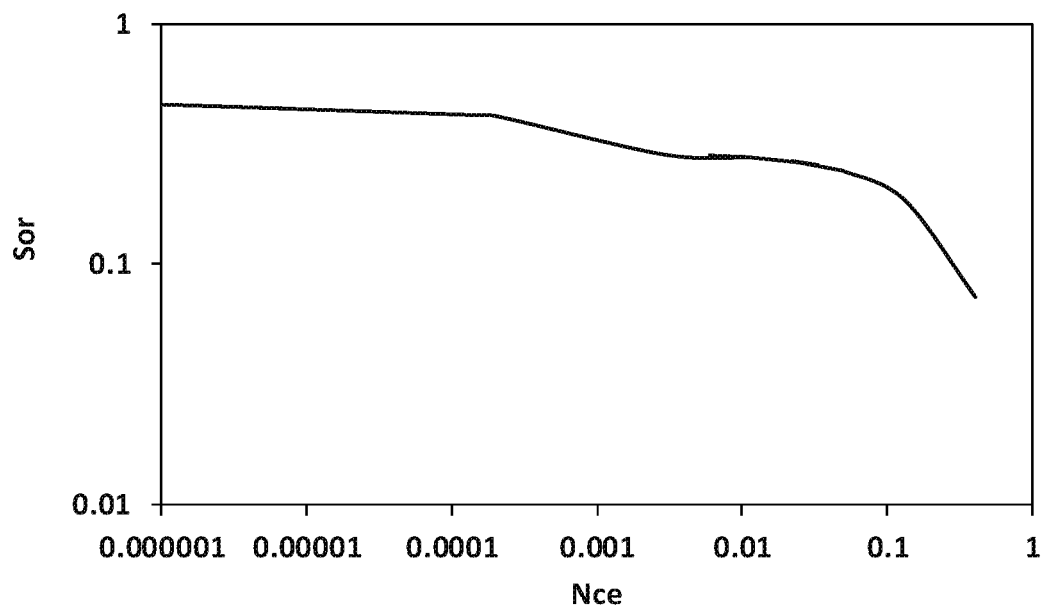
FIG. 4 is a graph showing extensional CDC generated using the proposed correlations.

Using these two fits, a predictive curve for different sets is generated, which looks more like a conventional CDC curve (FIG. 4).

To predict the $S_{or}$ reduction by viscoelastic polymers, only the bulk shear and extensional rheological properties of the polymer are needed. This can aid in the quick screening of optimal polymer for specific reservoir conditions. The curve is generated using different data sets that have a wide variation in polymer properties, flux rates, formation nature, oil viscosities, and rheological behaviors. The proposed correlation can predict the $S_{or}$ for varying range of polymer concentration (500 ppm to 6000 ppm), brine salinity (2000 ppm to 26,000 ppm), temperature (room temperature to 68° C.), flux rates (0.14 ft/day to 5.28 ft/day), permeability (160 mD to 7900 mD), oil viscosity (7 cP to 300 cP), porosity (0.18 to 0.37), different formations (Bentheimer sandstone, Berea sandstone, Boise sandstone, and Ottawa sand pack), different displacing fluids (viscoelastic polymers, viscous glycerin, and Newtonian water).

Extensional Capillary Number Vs Conventional Capillary Number

Figure 5:
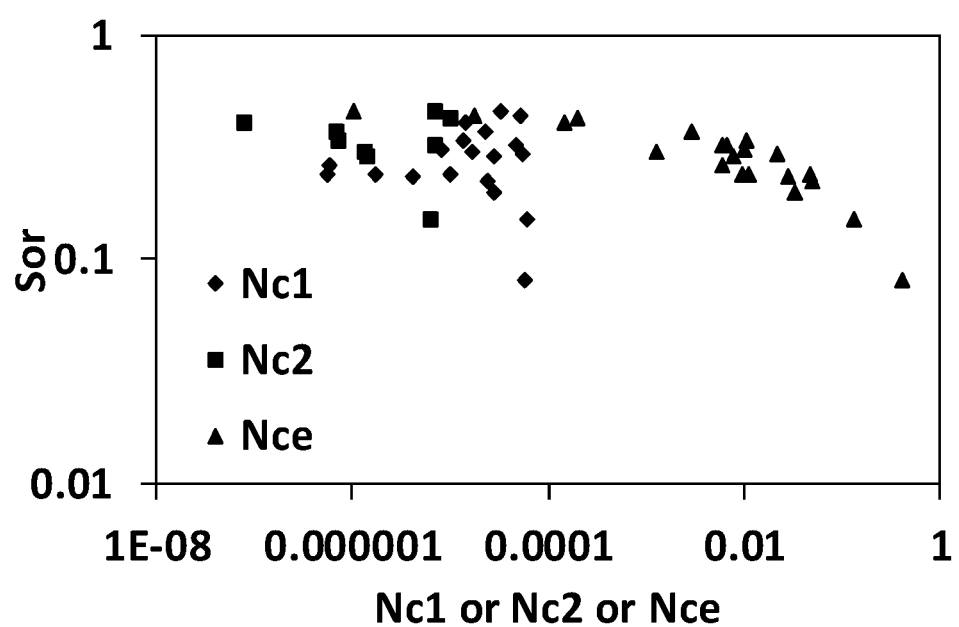
FIG. 5 is a plot showing the relation between $S_{or}$ verses $N_c$ and $N_{ce}$ of various polymers.

Next, the predictability of $N_{ce}$ is compared with $N_c$ (FIG. 5). The main limitation with the conventional $N_c$ is that $N_c$ values remain the same for the different sets of polymer solutions that show drastic differences in the $S_{or}$ reduction. The ability of polymer to reduce the $S_{or}$ differs based on their elastic nature, molecular weight, and salinity. For example, polymer flooding at the $N_c$ of $5.2*10^{-5}$ and flux rate of 1 ft/day in Bentheimer sandstone using viscous glycerin reduced the $S_{or}$ to 0.43, whereas the $S_{or}$ using viscoelastic HPAM 3630 was 0.198. In other cases (Experiments 2 to 9) conducted between the $N_c$ of $1*10^{-5}$ to $6*10^{-5}$ resulted in $S_{or}$ of up to 0.08 with HPAM 3630. $S_{or}$ values of HPAM polymer flood are significantly lower than the $S_{or}$ values of glycerin flood at the similar $N_c$ (Table 1 and Table 3). These variation in $S_{or}$ reduction clearly implies that conventional $N_c$ cannot explain the relevant mechanisms of $S_{or}$ reduction by the viscoelastic polymers.

Glycerin used in Experiment 23 corresponds to the $N_{ce}$ of $1.5*10^{-5}$. $N_{ce}$ of HPAM 3630 used in Experiment 1 is $6.7*10^{-2}$, which is almost three orders higher than the $N_{ce}$ of glycerin. However, $N_c$ of these HPAM 3630 and glycerin are $5*10^{-5}$ and $5.2*10^{-5}$ respectively. Since $N_{ce}$ of glycerin is slightly lower than its $N_c$, pore scale apparent viscosity should be slightly lower than the core scale apparent viscosity. Ashfargpour et al. (2012) also reported that core-scale pressure drop is higher than pore-scale pressure drops for the viscous polymers. Therefore, the notion that core scale apparent viscosity encompasses extensional viscosity (Clarke et al. 2016) appears to be true for viscous solutions. Lower $N_{ce}$ values of glycerin also indicate that it does not possess any additional extensional resistance at pore scale which is the reason for its higher $S_{or}$ value of 0.43. However, for viscoelastic HPAM, $N_{ce}$ is higher than $N_c$ by three orders which could have given the additional pore-scale extensional resistance needed for mobilizing the residual oil. Also, higher values of $N_{ce}$ for HPAM when compared to its $N_c$ indicates that pore-scale apparent viscosity is significantly higher than core-scale apparent viscosity. Similar observation was made by Ashfargpour et al.'s (2012) who reported that pressure drop exhibited by the viscoelastic polymers is higher around the pore scale when compared to pressure drop on the core-scale. Since the pore-scale apparent viscosity is dominated by the extensional resistance, Clarke et al. (2015)'s notion that core scale apparent viscosity encompasses extensional viscosity doesn't seems to be true for viscoelastic polymer solutions.

Furthermore, low saline HPAM solution at $N_c=5.6*10^{-5}$ and high saline HPAM solution at flooded at $N_c=2.4*10^{-5}$ resulted in $S_{or}$ of 0.32 and 0.22, respectively (experiment 5 and 6-Table 3). This suggests the ability of higher salinity polymer solution to contribute to significantly lower $S_{or}$ even if their $N_c$ values are slightly lower that of the lower salinity HPAM solution. $N_{ce}$ of low saline HPAM 3630 and high saline HPAM 3630 solutions used in the experiments 5 and 6 are $5.8*10^{-3}$ and $4.56*10^{-2}$ respectively. Higher $N_{ce}$ values shown by high saline polymer solutions suggests they possess relatively higher extensional resistance at the pore scale which lowers the $S_{or}$ significantly.

Similarly, lower Mw HPAM 3130 and higher Mw HPAM 6040 flooded at 1 ft/day in Berea sandstone (experiments 13 and 14) resulted in $S_{or}$ of 0.42 and 0.32, respectively. Their $N_c$ values are $9.08*10^{-5}$ and $7.05*10^{-5}$ respectively. Lower residual oil recovery despite higher $N_c$ during HPAM 3130 polymer flooding than HPAM 6040 also implies the inadequacy of conventional $N_c$. $N_{ce}$ of HPAM 6040 and HPAM 3130 used in the experiments 13 and 14 are $9*10^{-3}$ and $1*10^{-4}$ respectively. Higher $N_{ce}$ values shown by high Mw HPAM 6040 when compared to low Mw HPAM 3130 indicates the fact it possesses more extensional resistance at the pore scale which explain the lower $S_{or}$ observed during high Mw HPAM 6040 flooding. Clarke et al. (2016)'s concluded in their paper saying that viscoelastic polymers can recover residual oil more than expected from the shear and apparent viscosity. In this paper it is reiterated that extensional viscosity of high Mw polymers causes the significant lowering of $S_{or}$ even when the observed apparent viscosity of low Mw polymer is higher.

Another discrepancy is that oil mobilization is occurring at the $N_c$ values of less than $1*10^{-5}$, which is less than the critical $N_c$ value of $1*10^4$ (Abrams 1975; Qi et al. 2017). Complete oil mobilization up to $S_{or}$ of less than 0.1 occurs only when the $N_c$ value is $10^{-2}$ (Foster 1973; Abrams 1975; Chatzis and Morrow 1984; Jr. et al. 1985). However, HPAM 3630 used in Experiment 3 that resulted in the $S_{or}$ of 0.08 corresponds to the $N_c$ and $N_{ce}$ of $5.8*10^{-4}$ and $4.3*10^{-1}$, respectively. This indicates that while $N_c$ values are lower than the critical $N_c$, $N_{ce}$ values are exceeding it. The proper relation between $N_c$ and $S_{or}$ is not seen. The best trend one can observe for these data sets has the R2 value of only 2% to 5%. One cannot use the conventional $N_c$ for predicting the viscoelastic polymer's residual oil recovery potential and it therefore cannot be used for screening optimal polymers. The developed correlation using $N_{ce}$ has a R2 value of 91%. This clearly indicates the $N_{ce}$ is a better method than $N_c$ for quantifying the viscoelastic polymer's influence on $S_{or}$ reduction.

Extensional Capillary Number Vs Conventional Deborah Number

Figure 6:
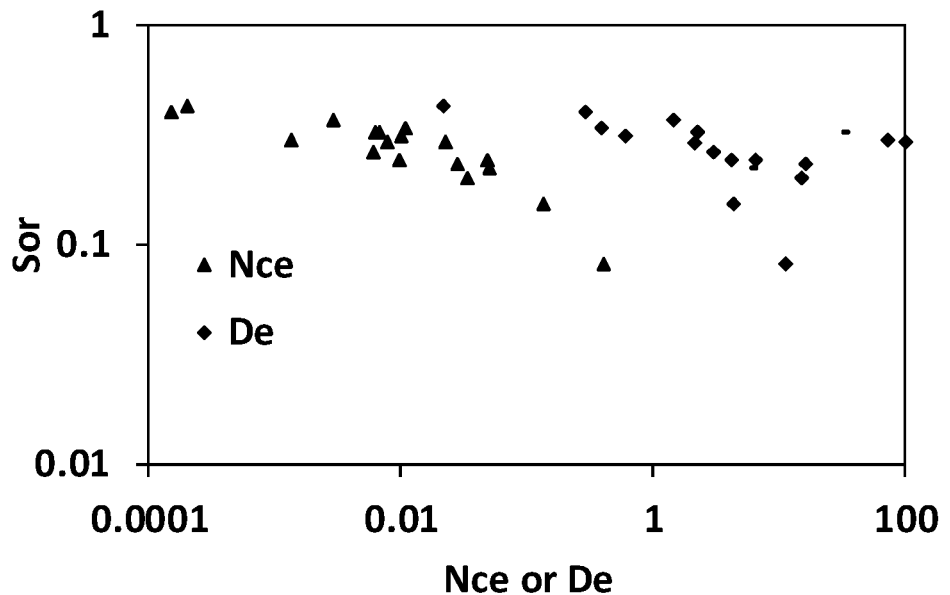
FIG. 6 is a plot showing the relation between $S_{or}$ verses $D_e$ and $N_{ce}$ of various polymers, with $S_{or}$ as a function of $D_e$ for experiment 5 and 6 are marked with a "-" sign.

Next, $N_{ce}$ is compared with oscillatory $D_e$ for predicting behavior of $S_{or}$ reduction during polymer flooding. $D_e$ is widely used in the quantification of polymer's viscoelastic effects on the $S_{or}$ reduction (Lotfollahi et al. 2016b; Qi et al. 2017; Erinick et al. 2018; Qi et al. 2018). As can be seen from FIG. 6, there is no proper trend between $D_e$ and $S_{or}$. An increase in $D_e$ shows the rapid decrease in $S_{or}$ up to a point, after which $S_{or}$ increases rapidly with an increase in $D_e$. These discrepancies are mainly caused by the salinity effect. Erinick et al. (2018) performed sequential flooding by injecting low saline polymer solutions and high saline polymer solutions at the same flux rate of 1 ft/day. Erinick et al. (2018) reported that lower salinity HPAM solution yielded $S_{or}$ of 0.32 whereas the higher salinity HPAM solution yielded $S_{or}$ of 0.22 (experiment 5 and experiment 6). However, the $D_e$ did not represent this trend. Points corresponding to $D_e$ and $S_{or}$ for experiment 5 and 6 are highlighted with a "-" sign in FIG. 6. As can be seen, increasing value of $D_e$ doesn't corresponds to the decreasing value of $S_{or}$. $N_c$ values for these experiments are similar (Table 3). Therefore, a modified $N_c$ is needed. $N_{ce}$ is plotted with $S_{or}$ reduction in FIG. 6. Unlike $D_e$, $N_{ce}$ shows a clear trend for all the experimental value of $S_{or}$. As the $N_{ce}$ increases $S_{or}$ decreases. It is important to note that the extensional rheological parameters are higher for the high saline solutions when compared to the low saline solutions (Table 1). Therefore, incorporating extensional rheology through pore-scale viscosity into $N_{ce}$ resulted in higher $N_{ce}$ value ($4.5*10^{-2}$) for higher salinity polymer solution and lower $N_{ce}$ value ($5.8*10^{-3}$) for lower salinity polymer solution. Similarly, in another polymer flooding performed by Erinick et al. (2018) using higher salinity HPAM solution (experiment 3) with $D_e$ of 11 at a flux rate of 4 ft/day resulted in the $S_{or}$ of 0.08. However, lower salinity HPAM solution flooding (experiment 4) with $D_e$ of 100 at a flux rate of 2 ft/day resulted in $S_{or}$ of 0.29. Higher values of extensional rheological parameters (FIGS. 10B and 11B) instigated the $N_{ce}$ of high saline solutions ($4.38*10^{-1}$) to be one order higher than low saline solutions ($4.2*10^{-2}$), thereby justifying the $S_{or}$ reduction (Table 3). Ehrenfried (2013) performed two flooding experiments using high saline and low saline viscoelastic polymer solutions (Experiment 7 and Experiment 9). The higher salinity polymer flooding performed at a flux rate of 5.28 ft/day and with a $D_e$ of 4.34 resulted in the $S_{or}$ of 0.151. However, the low saline polymer flooding experiments performed at a flux rate of 1.07 ft/day and a much higher $D_e$ of 72.9 resulted in the $S_{or}$ of 0.297. Moreover, even after increasing the flux rates to 5.34 ft/day and $D_e$ up to 364.54 during the lower salinity polymer flooding no significant oil mobilization occurred and the $S_{or}$ remained at 0.297. The oscillatory relaxation time of higher salinity polymer solution and lower salinity polymer solution, used in experiment 7 and experiment 9, are 0.11 seconds and 8.9 seconds, respectively (Ehrenfried 2013). Whereas, the extensional relaxation time measured in this work are 0.229 seconds and 0.117 seconds, respectively (Table 1). It is an implication that oscillatory relaxation time of lower salinity polymer solution is highly overestimated. Incorporating extensional parameter and pore-scale viscosity into modified capillary number resulted $N_{ce}$ value of $1.71*10^{-1}$ for higher saline polymer solutions is, two orders higher than the $N_{ce}$ of lower salinity polymer solution. These discussions point to the inefficiency of oscillatory rheology, which in turn is the reason for the skewed relation between oscillatory $D_e$ and $S_{or}$. On the other hand, $N_{ce}$ determined using the extensional rheological parameter is able to predict the $S_{or}$ reduction caused by the viscoelastic polymer solutions, including those varying in salinity.

Comparison with Qi et al. (2018)'s Correlation

Recently, Qi et al. (2018) proposed a relation between $S_{or}$ and $D_e$. The correlation was developed based on the value of $D_e$ (Equation 10 and Equation 11).

For $D_e$ less than 1, $$\frac{S_{orp}}{S_{orw}} = 1$$

For $D_e$ greater than 1, $$\frac{S_{orp}}{S_{orw}} = 1 - 0.133 * \log(D_e)$$

where
$S_{orp}$ is the residual oil saturation to polymer flood
$S_{orw}$ is the residual oil saturation to water flood.

Figure 7:
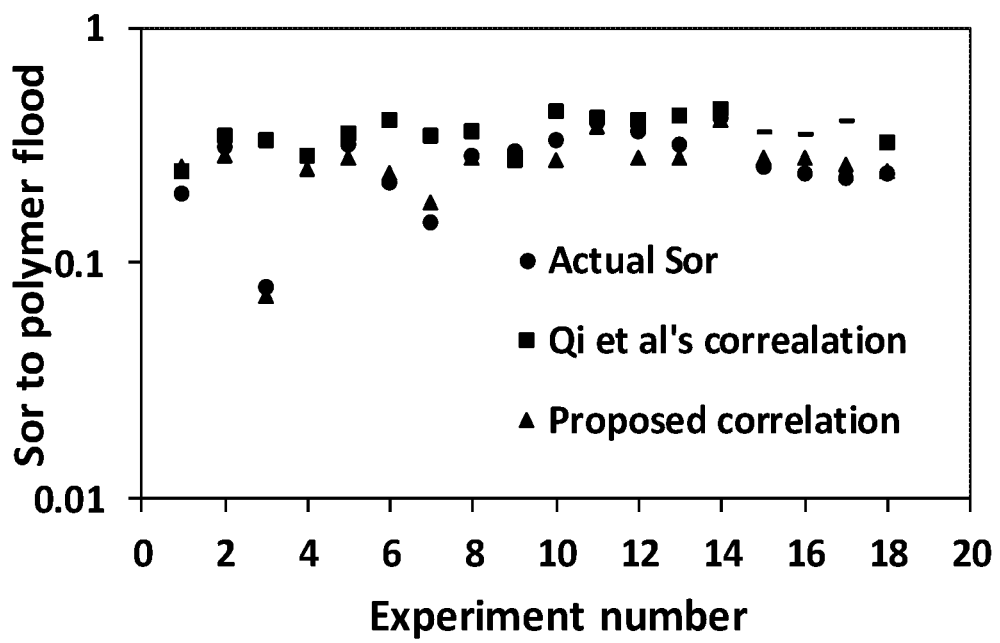
FIG. 7 is a plot comparing the actual $S_{or}$ values with the values predicted by proposed correlation and Qi et al. (2018)'s correlation for various experiments, with Qi et al's prediction for experiment 15, 16 and 17 are shown with a "-" sign.
Figure 8A:
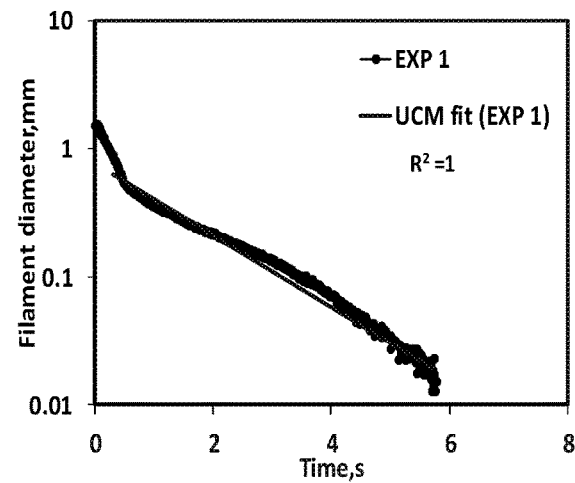
FIGS. 8A-8C show graphs of filament diameter vs time plot for EXP 1 and the UCM fit to the linear elastic regimes for the determination of relaxation time b) Extensional viscosity as a function of generated strain rate plot showing the sharp rise in the extensional viscosity around the critical Deborah number c) Power law fit to the extensional viscosity vs Hencky strain values around the critical Deborah number for the determination of strain hardening index.
Figure 8B:
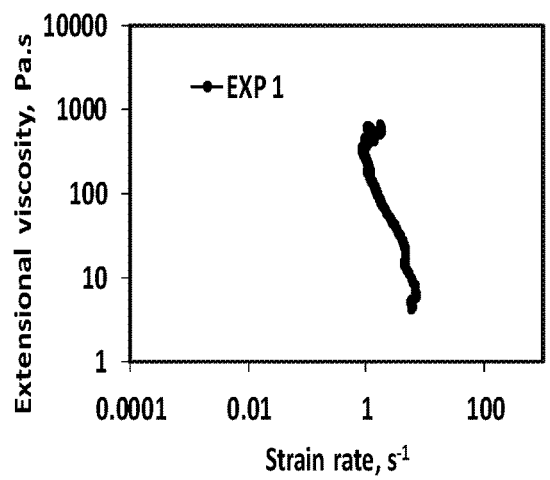
Figure 8C:
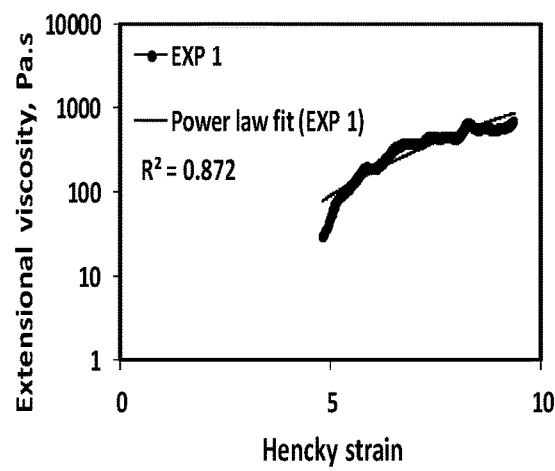

$S_{or}$ to polymer flood can be predicted using Qi et al.'s (2018) correlation if the Sow and $D_e$ are known. The correlation presented in this work (Equation 8 and Equation 9) can also predict the $S_{or}$ to polymer flooding, if $N_{ce}$ is known. Both of these methods do not require any core flood experiments. $S_{or}$ to polymer flood predicted by the proposed correlation and Qi et al.'s (2018) correlation are compared with observed $S_{or}$ values in FIG. 7 and Table 5.

The correlation by Qi et al.'s (2018) over predicts the $S_{or}$ for the Polymer flooding conducted using high salinity brine (experiment 3, 6 and 7). An opposite behavior is seen during lower salinity polymer flooding in experiment 9 where $S_{or}$ predicted by the Qi et al.'s (2018) correlation is lower than the actual. Since Qi et al.'s (2018) correlation depends on the oscillatory Deborah number it over predicts the elastic effect of low saline solutions and under predicts the elastic effects of high saline solutions. During the extensional rheology performed in this study, the higher salinity polymer solution used in the experiment 3, 6 and 7 shows relatively higher extensional relaxation time, strain hardening index and maximum extensional viscosity than the low saline polymer solutions used in the experiment 4, 5 and 9 (Table 1). Pore-scale apparent viscosity is directly proportional to extensional relaxation time, strain hardening index and maximum extensional viscosity at the critical Deborah number (Equation 5). Therefore, the pore-scale apparent viscosity of high saline solutions with relatively higher extensional resistance is higher than low saline polymer solutions (Table 3). Since $N_{ce}$ incorporates pore-scale apparent viscosity as the driving viscous force, high saline solutions with higher pore-scale resistance corresponded to the higher $N_{ce}$ values than the low saline polymer solutions. Therefore, the proposed correlation overcomes the limitations in Qi et al.'s (2018) correlation to predict the actual $S_{or}$ values at different salinities during polymer flooding. The actual $S_{or}$ values and the values predicted by the proposed correlation are quite actuate at both high and low salinities. One of key findings here is that it is possible to obtain lower $S_{or}$ at high salinity polymer flooding if the polymer extensional properties are higher.

It is also important to note that Qi et al.'s (2018) correlation was developed using experiments conducted on Bentheimer and Berea sandstone. Therefore, prediction of Sa, during polymer flooding in high permeability sand pack is slightly off using their correlation (experiment 15, 16 and 17). These points are shown as a "-" symbol in FIG. 7. Particularly in experiment 17, there is a notable difference between the $S_{or}$ predicted by the Qi et al.'s (2018) correlation ($S_{or}$=0.394) and observed $S_{or}$ of 0.23 (Table 3). Besides the high permeability, oil viscosity (250 cP) is relatively very high in experiment 17, resulting in poor sweep during water flooding and high $S_{or}$ because of residual as well as unswept oil. Since Qi et al.'s (2018) correlation uses $S_{or}$ to water flood, the predicted value of $S_{or}$ to polymer flood will also be higher for experiment 17. However, in reality, $S_{or}$ to polymer flood will become lower in the high permeable sand pack due to low capillarity once the viscous fingering is prevented by the polymer flooding. The correlation proposed in this work predicts the $S_{or}$ to polymer flood without having any dependence on the $S_{or}$ to water flood. Therefore, the $S_{or}$ predicted by the proposed correlation for high permeable experiments are comparable with the actual values. For example, $S_{or}$ predicted by the proposed correlation for the experiment 17 is 0.241 which is closer to actual value of 0.23 (Table 3 and FIG. 7).

Accordingly, the present invention provides that the extensional capillary is the first and only version of the capillary number that can be used to quantify the $S_{or}$ reduction caused by the viscoelastic polymer solutions. A comparative prediction is made between the $N_{ce}$, $N_c$, and $D_e$. The limitation associated with conventional $N_c$ and $D_e$ is clearly highlighted and a detailed discussion is provided on why the proposed $N_{ce}$ is a better method. Capillary theory considered to be invalidated in the case of viscoelastic polymer flooding is validated using the $N_{ce}$. The correlation developed using the $N_{ce}$ is the first and only method that can predict the $S_{or}$ reduction caused by the viscoelastic polymer solutions through bulk extensional rheology. This will help in choosing the optimal polymer for specific reservoir conditions. The correlations are developed using 23 different data sets. The correlation could predict the $S_{or}$ reduction shown by the viscoelastic polymer solutions after the critical $N_c$. The proposed correlations can predict the $S_{or}$ for a varying range of reservoir permeability (169 mD to 7.9 D), porosity (0.18 to 0.37), brine salinity (2000 ppm to 26000 ppm), concentration (500 ppm to 6000 ppm), polymer molecular weight (6 MDa to 35 MDa), flux (0.14 ft/day to 5.8 ft/day), sandstone (benthemier, boise, berea, and sand pack), and oil viscosity (7 cP to 300 cP). For high saline viscoelastic polymer flooding, the proposed correlation has a better $S_{or}$ predictability than Qi et al.'s (2018) correlation. $N_{ce}$ and the proposed correlation can be incorporated into the reservoir simulator for predicting the $S_{or}$ reduction potential of the viscoelastic polymers. The method is shown as a flow chart in FIG. 31 in which Equation 7 is used to calculate $N_{ce}$ for each of a plurality of polymers. The calculated $N_{ce}$ values for each polymer are then compared and the optimal polymer is selected for a set of specific reservoir conditions based on calculated $N_{ce}$ for each polymer.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient roadmap for implementing the exemplary embodiment or exemplary embodiments. It should be understood that various changes may be made in the function and arrangement of elements without departing from the scope as set forth in the appended claims and the legal equivalents thereof.

REFERENCES

1. Abrams, A. 1975. The Influence of Fluid Viscosity, Interfacial Tension, and Flow Velocity on Residual Oil Saturation Left by Waterflood. *SPE Journal*. 15(05): 437-447. SPE 5050-PA.
2. Afsharpoor, A., Balhoff, M. T., Bonnecaze, R., and Huh, C. 2012. CFD Modelling of the Effect of Polymer Elasticity on the Residual oil Saturation at the Pore-scale. *Journal of Petroleum Science and Engineering*. 94:79-88.
3. Azad, M. S. 2014. Evaluation of Novel Viscoelastic System as the Potential Chemical EOR Method for Carbonate reservoirs; KFUPM Library, Saudi Arabia
4. Azad, M. S. and Sultan, A. S. 2014. Extending the Applicability of Chemical EOR to High Temperature, High Salinity and Fractured Carbonate Formation through Viscoelastic Surfactants. Presented at SPE Annual Saudi Technical symposium, Khobar, 21-24 April, SPE 172188-MS.
5. Azad, M. S., Dalsania, Y. and Trivedi, J. J. 2018a. Capillary breakup Extensional Rheometry of Associative and Hydrolyzed polyacrylamide for oil recovery applications. *Journal of Applied Polymer Science*. 135. 46253-46264.
6. Azad, M. S., Dalsania, Y. and Trivedi, J. J. 2018b. Understanding the Flow Behavior of Copolymer and Associative polymer using Extensional Viscosity Characterization: Effect of Hydrophobic Association, *Canadian Journal of Chemical Engineering*. 96 (11): 2498-2508.
7. Azad, M. S. and Trivedi, J. J. 2018 a. Extensional Rheological Data from Ex-situ Measurements for predicting Porous Media behavior of the viscoelastic EOR polymers. *Data in Brief*. 20: 293-305.
8. Azad, M. S. and Trivedi, J. J. 2018b. Does polymer's Viscoelasticity Influence the Heavy oil Sweep Efficiency and injectivity at 1 ft/day? To be presented at the SPE International Heavy oil Conference and Exhibition, Kuwait city, 10-12 December, SPE 193771-MS.
9. Azad, M. S. and Trivedi, J. J. 2019a. Quantifications of viscoelastic effects During Polymer Flooding: A Critical Review. *SPE Journal*—Accepted.
10. Azad, M. S. and Trivedi, J. J. 2019b. Extensional Rheological Role in the Viscoelastic Polymer Flooding. Unanswered questions—myth or reality? Under review with *SPE Journal*.
11. Azad, M. S. and Trivedi, J. J. 2019c. A Novel Viscoelastic Model for Predicting the Synthetic Polymer's Viscoelastic Behavior in Porous Media Using Direct Extensional Rheological Measurements. *Fuel*. 235: 218-226.
12. Barnes, H. A., Hutton, J. F., and Walters, K. 2010. An Introduction to Rheology. 1st edition. Elsevier Science Publishers B. V. Amsterdam.
13. Chatzis, I., Kuntamukkula, M. S., and Morrow, N. R. 1988. Effect of Capillary Number on the Microstructure of Residual oil in the Strongly Water-Wet Sandstones. *SPE Reservoir Engineering*. 3 (3): 902-912, SPE-13213-PA.
14. Chatzis, I and Morrow, N. R. 1984. Correlation of Capillary Number Relationship for Sandstone. *SPE Journal*. 24 (05): 555-562. SPE-10114-PA. https://doi.org/10.2118/10114-PA
15. Chen, G., Han, P., Shao, Z. et al. 2011. History Matching Method for High Concentration Viscoelasticity Polymer flood in the Daqing Oilfield. Presented at the SPE EOR conference, Kuala Lampur, 19-21 July. SPE 144538-MS. https://doi.org/10.2118/144538-MS
16. Clarke. A., Howe. A. M., Mitchell, J. et al. 2016. How Viscoelastic Polymer flooding Enhanced Displacement Efficiency. SPE Journal. 21 (3): 675-687. SPE 174654-PA.
17. Clasen, C. 2010. Capillary Breakup Extensional Rheometry of Semi-Dilute Polymer Solutions. *Korea Austrain Rheology Journal*. 22 (04): 331-338.
18. Clemens, T., Kornberger, M., and Lueftenegger, M. 2016. Polymer Injection to Rejuvenate a Super mature oil field, Polymer pilot results, 8 TH Reservoir, Austria. Presented at the Abu Dhabi International Petroleum Exhibition and Conference, Abu Dhabi, 7-10 November, SPE 183010-MS.
19. Cottin, C., Bourgeois, M., Bursaux, R. et al. 2014. Secondary and Tertiary Polymer Flooding on the Highly Permeable Reservoir Cores: Experimental Results. Presented at the SPE EOR Conference at Oil and Gas West Asia, Muscat, 31 March-2 April. SPE 169692-MS.
20. Delshad, M., Kim, D. H., Magbagbeola, O. A. et al. 2008. Mechanistic Interpretation and Utilization of Viscoelastic Behaviour of Polymer Solutions for Improved Polymer-Flood Efficiency. Presented at SPE Improved Oil Recovery Symposium, Tulsa, 24-28 April, SPE 113620-MS.
21. De Melo, M. A., De Holleben, C. R. C., Da Silva, I. P. G. et al. 2005. Evaluation of Polymer Injection Projects in Brazil. Presented at the SPE Latin American and Caribbean Petroleum Engineering Conference, Rio de Janeiro, 20-23 June, SPE 94898-MS.
22. Ehrenfried, D. 2013. Impact of Viscoelastic Polymer Flooding on Residual oil Saturation in Sandstones. MS thesis, University of Texas at Austin, Austin, Texas (December 2013).
23. Erincik, M. Z., Qi, P., Balhoff, M. T. et al. 2018. New Method to Reduce the Residual Oil Saturation by Polymer flooding. *SPE Journal*. 23 (05): 1944-1956. https://doi.org/10.2118/187230-PA Foster, W. R. 1973. A Low Tension Water flooding Process. SPE Journal. 25 (02): 205-210. SPE 3803-PA.
24. Greaves, B. L. Marshall, R. N. and Thompson, J. H. 1984 Hitts lake Unit Polymer Project. Presented at 59th Annual Technical Conference and Exhibition. Dallas, Texas. 16-19 September. SPE 13123-MS.
25. Green, D. and Willhite, P. 1998. Enhanced Oil Recovery, Vol. 6. Richardson, Texas: SPE. Textbook Series.
26. Haas, R. and Durst, F. 1982. Viscoelastic Flow of Dilute Polymer Solutions in Regularly Packed Beds. *Rheologica Acta*. 21: 566-571.
27. Han, M., Alsofi, A K., Fuseni, A. et al. 2013. Development of Chemical EOR Formulations for the High Temperature and High Salinity Carbonate Reservoir. Presented at the International Petroleum Technology Conference, Beijing, 26-28 March, IPTC 17084-MS.
28. Hincapie, R. E. and Ganzer, L. 2015. Assessment of Polymer Injectivity with Regards to Viscoelasticity; Lab Evaluations towards Better Field Operations. Presented at the EUROPEC, Madrid, 1-4 June, SPE 174346-MS.
29. Hirasakhi, G and Pope, G. 1974. Analysis of Factors Influencing Mobility and Adsorption in the Flow of Polymer Solutions through Porous Media. *SPE Journal*. 14 (4): 337-346. SPE-4026-PA.
30. Hochanadel, S. M., Lunceford, M. L. and Farmer, C. W. 1990. A Comparison of 31 Minnelusa polymer floods with 24 Minnelusa water floods. Presented at the SPE IOR symposium, Tulsa, Oklahoma. 20-22 April, SPE 20234-MS.
31. Humphry, K. J., Suijkerbuijk, B. M. J. M., Van der Linde, H. A., Pieterse, S. G. J., and Masalmeh, S. K. 2014. Impact of Wettability alteration on Residual Oil Saturation and Capillary Desaturation Curves. *Petrophysics*. 55 (04): 313-318.
32. Jiang, H. F., Wu, W. X., Wang, D. M. et al. 2008. The Effect of Elasticity on Displacement Efficiency in the Lab and Results of High Concentration Polymer Flooding in the Field. Presented at SPE Annual Technical Conference and Exhibition, Denver, Colorado, 21-24 September, SPE 115315-MS.
33. Johannesen, E. B. and Graue, A. 2007. Mobilization of Remaining oil—Emphasis on the Capillary number and Wettability. Presented at the International Oil Conference and Exhibition in Mexico, Veracrux, 27-30 June. SPE 108724-MS.
34. Jr. R. A. F., Ertekin, T., and Stahl, C. D. 1985. Effect of Capillary Number and Its Constituent on the Two-Phase Relative Permeability Curves. *Journal of Petroleum Technology* 37(02): 249-260. SPE 12170-PA.
35. Kamal, M. S., Hussein, I. A., and Sultan, A. S. 2017. Review on Surfactant flooding: Phase Behavior, Retention, IFT, and Field Applications. *Energy and Fuels*. 31 (08): (7701-7720). 10.1021/acs.energyfuels.7b00353
36. Karnanda, W., Benzagouta, M. S., Al Quraishi, A R. 2012. Effect of temperature, pressure, salinity, and surfactant concentration on IFT for surfactant flooding optimization. *Arabian Geo Science*. 6: 3535-3544. 10.1007/s12517-012-0605-7
37. Kim, N. J., Pipe, C. J., Ahn, K. H. et al. 2010. Capillary Breakup Extensional Rheometry of a Wormlike Micellar Solution. *Korea Australia Rheology Journal*. 22 (1): 31-41
38. Koh, H., Lee, V. B., and Pope, G. A. 2017. Experimental Investigation of the Effect of Polymers on Residual Oil Saturation. *SPE Journal*. 23 (1): 1-17. SPE-179683-PA.
39. Kumar, P., Raj, R., Koduru, N. et al. 2016. Field Implementation of Mangala Polymer Flood: Initial Challenges, Mitigation and Management. Presented at the SPE EOR conference at Oil and Gas, West Asia, 21-23 March, SPE 179820-MS.
40. Lotfallahi, M., Koh, H., Li, Z. et al. 2016. Mechanistic Simulation of Residual Oil in the Viscoelastic Polymers Floods. Presented at SPE EOR conference at Muscat, Oman, 21-23 March, SPE 178844-MS.
41. Luo, H., Delshad, M., Zhao, B. et al. 2017. A Fractional Flow Theory for Unstable Immiscible Floods. Presented at the SPE Canada Heavy Oil Technical Conference, Calgary, Alberta, 15-16 February, SPE 184996-MS.
42. Masuda, Y., Tang, K. C., Miyazawa, M. et al. 1992. 1D Simulation of Polymer flooding including the viscoelastic effect of Polymer solutions. *SPE Reservoir Evaluation and Engineering*. 7 (02): 247-252.SPE19499-PA.
43. Magbagbeola, O. A. 2008. Quantification of Viscoelastic Behavior of High Molecular weight polymers used chemical enhanced oil recovery, MS thesis, UT Austin, Texas, USA.
44. Melrose, J. C. and Brandner, C. F. 1974. Role of Capillary Forces in Determining Microscopic Displacement Efficiency for Oil Recovery by Water flooding. *Journal of Canadian Petroleum Technology*. 13(4): 54-62.10.2118/74-04-05.
45. Moffitt, P. D. and Mitchell, J. F. 1983. North Burbank Unit Commercial Scale Polymer flood Project. Presented at the Production Operation Symposium, Osage County, Oklahoma, February 27-March 1. SPE 11560-MS. https://doi.org/10.2118/11560-MS
46. Peter, E. J. 2002. Advanced Petro physics, Live Oak Book Company, Texas.
47. Qi, P., Ehrenfried, D. H., Koh, H., and Balhoff, M. T., 2017. Reduction of Residual Oil Saturation in Sandstone Cores by the use of Viscoelastic Polymers. *SPE Journal*. 22 (02): 447.
48. Qi, P., Lashgari, H., Luo, H., Delshad, M., Pope, G. and Balhoff, M. 2018. Simulation of Viscoelastic Polymer Flooding—From the Lab to the Field. Presented at the SPE Annual Technical Conference and Exhibition, Dallas, Texas, 24-26 September, SPE 191498-MS.
49. Seright, R. S. 2017. How Much Polymer should be Injected during a Polymer Flood? Review of Previous and Current Practices. *SPEJ*. 22 (1): 1-18. SPE 179543-PA.
50. Sheng, J. J., Leonhardt, B., and Azri, N. 2015. Status of Polymer-Flooding Technology. *Journal of Canadian Petroleum Technology*. 54 (02): 116-126.
51. Stavland, A., Jonsbraten, H. C., Lohne, A. et al. 2010. Polymer flooding—Flow Properties in Porous Media versus Rheological Parameters. Presented at SPE EUROPEC/EAGE Annual Conference and Exhibition, Barcelona, 14-17 June, SPE 131103-MS.
52. Stegemeier, G. L. 1974. Relationship of Trapped Oil Saturation to Petrophysical Properties of the Porous Media. Presented at Improved Oil Recovery Symposium, Tulsa, Oklahoma, 22-24 April, SPE 4754-MS.
53. Vermolen, E. C. M., Haasterecht, M. J. T., Masalmeh, S. K. 2014. A systematic Study of the Polymer Viscoelastic Effects on the Residual Oil Saturation by Core Flooding. Presented at the SPE EOR conference, Muscat, Oman, 31 March-2 April. SPE 169681-MS.
54. Wang, D., Cheng, J., Yang, Q. et al. 2000. Viscous-Elastic Polymer Can Increase Microscale Displacement Efficiency in Cores. Presented at the 2000 SPE Annual Technical Conference and Exhibition, Dallas, 1-4 October, SPE 63227-MS.
55. Wang, D., Cheng, J., Xia, H., Li, Q. et al. 2001. Viscous-Elastic Fluids Can Mobilize Oil Remaining after Water-Flood by Force Parallel to the Oil-Water Interface. Presented at the SPE Asia Pacific Improved Oil Recovery Conference, Kuala Lumpur, 8-9 October, SPE-72123-MS.
56. Wang, D. M., Wang, G, Wu, W. et al. 2007. The Influence of Viscoelasticity on Displacement Efficiency-from Micro to Macro Scale. Presented at SPE Annual Technical Conference and Exhibition, Anaheim, California, 11-14 Nov. 2007. SPE 109016-MS.
57. Wang, D. M., Wang, G, Wu, W. et al. 2007. The Influence of Viscoelasticity on Displacement Efficiency—from Micro to Macro Scale. Presented at SPE Annual Technical Conference and Exhibition, Anaheim, California, 11-14 Nov. 2007. SPE 109016-MS.
58. Wang, D., Xia, H., Yang, S. et al. 2010. The Influence of Visco-elasticity on Micro Forces and Displacement Efficiency in Pores, Cores and in the Field. Presented at the SPE EOR Conference at Oil and Gas West Asia, Muscat, Oman, 11-13 April, SPE-127453-MS.
59. Wang, D., Wang, G., and Xia, H. 2011. Large Scale High Visco-Elastic Fluid Flooding in the Field Achieves High Recoveries. Presented at the SPE EOR Conference, Kuala Lumpur, 19-21 July. SPE-144294-MS.
60. Wang, Z. B., Wang, Q., Ma, D. S. et al. 2013. A New Method of Numerical Simulation for Viscoelastic polymer flooding. Presented at the SPE Reservoir Characterization and Simulation Conference, Abu Dhabi, 16-18 September, SPE 165972-MS.
61. Xia, H., Wang, D., Wu, J. et al. 2004. Elasticity of HPAM Solutions Increases Displacement Efficiency under Mixed Wettability Conditions. Presented at the SPE Asia Pacific Oil and Gas Conference and Exhibition, *Perth,* 18-20 October, SPE 88456-MS.
62. Xia, H., Wang, D., Wu, W. et al. 2007. Effect of Viscoelasticity of Displacing Fluids on the Relationship between the capillary number and displacement efficiency in weak oilwet core. Presented at the Asia Pacific Oil and Gas Conference and Exhibition, Jakarta, 30 October-1 November, SPE 109228-MS. https://doi.org/10.2118/109228-MS

The invention claimed is:

1. A method of selecting an optimal polymer for polymer flooding during enhanced oil recovery (EOR), said method comprising:

quantifying a viscoelastic effect of a plurality of polymers on residual oil saturation ($S_{or}$) by calculating an extensional capillary number ($N_{ce}$) for each of said plurality of polymers using $$N_{ce} = \frac{v \times \mu_{app-pore}}{\sigma}$$

where v is flux, $\mu_{app-pore}$ is pore-scale apparent viscosity, and $\sigma$ is interfacial tension (IFT) that accounts for said polymer's viscoelastic forces that are responsible for $S_{or}$ reduction;

comparing the calculated extensional capillary number for each of said plurality of polymers; and selecting the optimal polymer for a set of specific reservoir conditions based on the calculated extensional capillary number for each of said plurality of polymers.

2. The method of claim 1 further comprising compiling a database of calculated extensional capillary numbers for a plurality of polymers.

3. The method of claim 2 wherein the database includes a curve generated from the calculated extensional capillary numbers for a plurality of polymers properties, flux rates, formation nature, oil viscosities, and rheological behaviors.

4. The method of claim 2 wherein the database is configured to predict the $S_{or}$ for a varying range of polymer concentration, brine salinity, temperature, flux rates, permeability, oil viscosity, porosity, a plurality of formations, a plurality of displacing fluids.

5. The method of claim 4, wherein the brine salinity is between 2000 ppm to 26,000 ppm.

6. The method of claim 4 wherein the flux rate is between 0.14 ft/day to 5.28 ft/day.

7. The method of claim 4 wherein the permeability is between 160 mD to 7900 mD.

8. The method of claim 4 wherein the oil viscosity is between 7 cP to 300 cP.

9. The method of claim 4 wherein the porosity is between 0.18 to 0.37.

10. The method of claim 4 wherein the plurality of formations include any of Bentheimer sandstone, Berea sandstone, Boise sandstone, and Ottawa sand pack.

11. The method of claim 4 wherein the plurality of displacing fluids include any of viscoelastic polymers, viscous glycerin, and Newtonian water.

12. The method of claim 1 wherein the flux (v) is between 0.2 ft/day to 5 ft/day.

13. The method of claim 1 wherein an increase in the $N_{ce}$ will result in an increase in the $S_{or}$ reduction.

* * * * *